United States Patent [19]
Drogichen et al.

[11] Patent Number: 5,931,938
[45] Date of Patent: Aug. 3, 1999

[54] MULTIPROCESSOR COMPUTER HAVING CONFIGURABLE HARDWARE SYSTEM DOMAINS

[75] Inventors: Daniel P. Drogichen, Leucadia; Andrew J. McCrocklin; Nicholas E. Aneshansley, both of San Diego, all of Calif.

[73] Assignee: Sun Microsystems, Inc., Mountain View, Calif.

[21] Appl. No.: 08/763,934

[22] Filed: Dec. 12, 1996

[51] Int. Cl.⁶ .............................. G06F 15/77; G06F 11/00
[52] U.S. Cl. ............................................... 712/15; 712/23
[58] Field of Search ........................... 395/800.15, 800.23

[56] References Cited

U.S. PATENT DOCUMENTS

| | | | |
|---|---|---|---|
| 5,649,106 | 7/1997 | Tsujimichi et al. ................ | 395/800.15 |
| 5,680,634 | 10/1997 | Estes ................................... | 395/800.15 |
| 5,689,661 | 11/1997 | Hayashi et al. .................... | 395/800.15 |
| 5,710,938 | 1/1998 | Dahl et al. ......................... | 395/800.15 |
| 5,784,802 | 7/1998 | Greenstein et al. ............... | 395/800.15 |

*Primary Examiner*—Mark R. Powell
*Assistant Examiner*—Jeffrey Allen Rossi
*Attorney, Agent, or Firm*—Schwegman, Lundberg, Woessner & Kluth, P.A.

[57] ABSTRACT

Global address and data routers interconnect individual system units each having its own processors, memory, and I/O. A domain filter coupled to the routers dynamically defines groups of system units as domains and clusters of domains which have both software and hardware isolation from each other. Clusters can share dynamically definable ranges of memory with each other. The domain filter has software-loadable registers on the system units and in the global routers to set the parameters of the domains and clusters. The registers label individual inter-system transactions on the routers as invalid for system units not in the same domain or cluster as the originating unit.

39 Claims, 13 Drawing Sheets

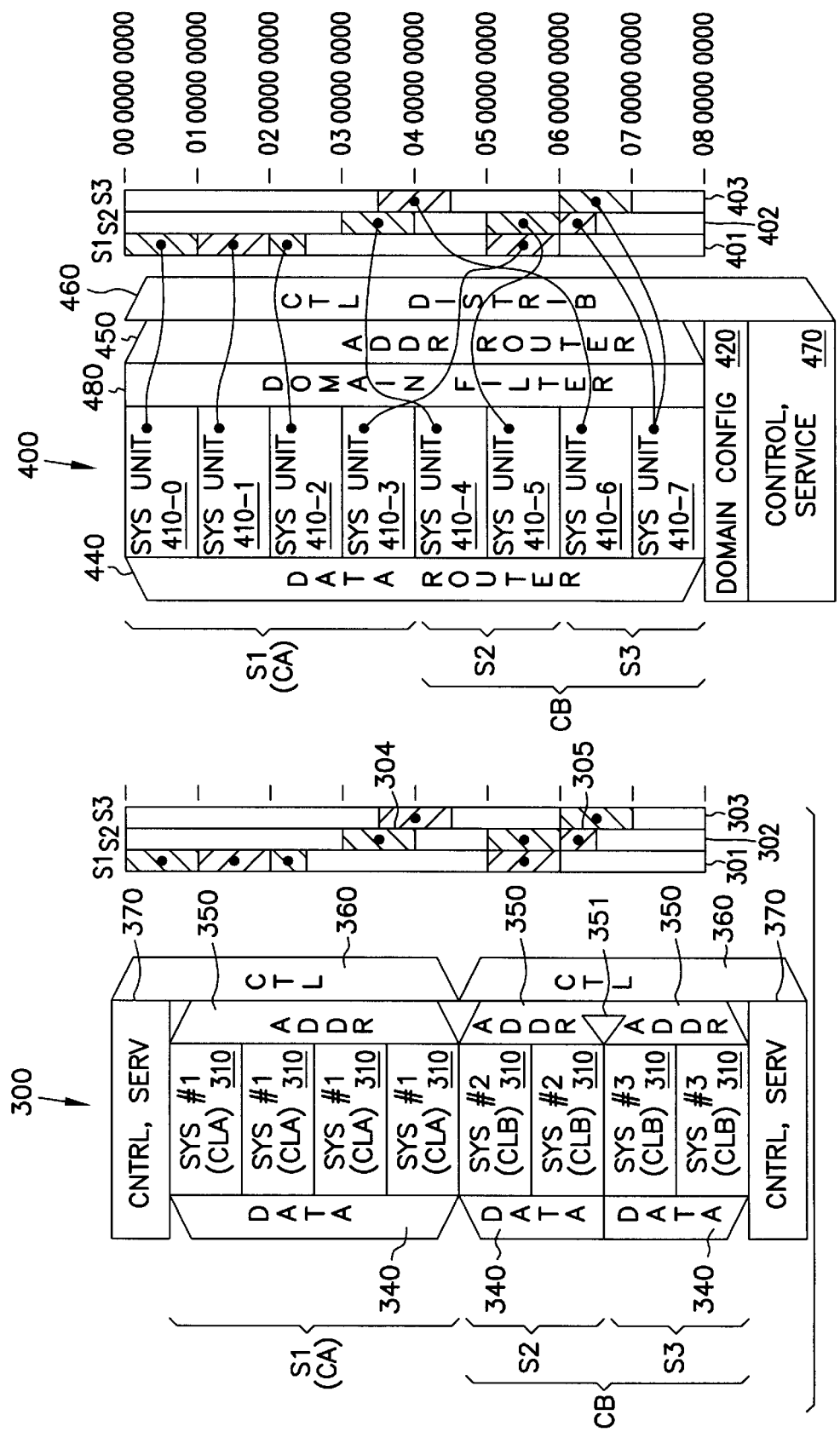

MULTIPROCESSOR COMPUTER HAVING CONFIGURABLE HARDWARE SYSTEM DOMAINS

BACKGROUND OF THE INVENTION

The present invention relates to electronic computers, and more particularly concerns multiprocessor architectures in which a large number of processors can be dynamically isolated into variable groups or domains for operational independence and for the ability to continue running despite hardware errors.

Many centralized mainframe computers driving large numbers of simple terminals have been replaced by networks of personal computers. Most of these networks incorporate one or more server computers which store data and programs for the individual users. In fact, the servers are evolving into high-performance superservers which have taken over many of the attributes of mainframes. However, a superserver functions differently in a networked system, and thus the architecture of a superserver needs to be different from those of mainframes or of personal computers.

One area in which superservers differ from other architectures is their need to be able to run more than one operating system or more than one version of an operating system—simultaneously for different jobs or for different users.

Superservers must also have a very high availability and reliability. They must have high tolerance for both hardware and software errors, and it is desirable that the computer be serviceable while it is running. Unlike the single (or closely-coupled multiple) processor architectures of personal computers, and also unlike the massively parallel designs of supercomputers, superservers need the flexibility to run widely varying numbers and types of tasks with unpredictable resource demands.

In many ways, superservers are called upon to perform both as very large computers and as small computers. This places a number of conflicting demands upon their architectures.

SUMMARY OF THE INVENTION

The present invention provides an overall computer architecture which overcomes these and related problems by means of software configurable "hardware domains" which isolate the overall computer into a number of independent units for both software and hardware aspects. That is, different domains not only run different operating systems and applications independently of each other, but also operate independently of fatal hardware errors occurring in other domains. "Clusters" allow multiple domains to share a common range of memory addresses, for rapid data transfer. Privileged configuration-control software allows an operator or software process to divide the computer resources into domains and domain clusters without physically altering the computer, and to reconfigure the domains and clusters at any time. A computer using this architecture may be constructed of easily obtainable commodity components, such as the microprocessors commonly employed in personal or workstation computers.

The invention allows the testing of new versions of software in a completely isolated environment, while continuing normal tasks in the remainder of the computer. One part of the computer may run extended diagnostics or preventive maintenance, while the remainder executes normal user tasks concurrently. Different parts of the same computer can run under different operating-system software (or different versions of the same software, or different tunings or parameter settings), for optimizing multiple different types of workload, such as timeshare and database-query, or online transaction processing and decision-support systems.

Each part of the computer is insensitive not only to software errors in the other parts, but also to hardware faults such as hard memory errors and address-request line malfunctions. A computer according to the invention prevents hardware faults from erroneously transferring address or data signals to any processor or memory not in the same hardware domain, and physically prevents many system-wide control signals from affecting hardware in different domains.

Additional advantages will be obvious to those skilled in the art. For example, interactive jobs can be isolated from batch jobs by running them in different domains. Production tasks may be executed uninterrupted in one domain while development or problem isolation occurs simultaneously in another domain. New software releases can be tested for compatibility on the same system which simultaneously runs the old releases. Sometimes multiple organizations share the same system; using separate domains, each can be guaranteed a certain level of resource dedication to their own tasks, and this dedication can be scheduled easily or altered upon short notice merely by reconfiguring the domains and clusters under software control, without physically replacing components or manually switching signal lines.

Briefly, a computer according to the invention has a number of individual system units each having processors, memory segments, and/or input/output adapters. A central interconnect transports addresses and data among the system units. A domain controller dynamically configures a domain filter to form multiple domains which function independently of each other, and which are even independent of major hardware errors in other domains. The processors, memory, and I/O of a domain act as a single, unified computing system, regardless of their physical location on the same or different system units. In addition, multiple domains can be dynamically interconnected into clusters to share some or all of their memory space. The domains and clusters are defined by the contents of registers set under software control.

All communications among the various system units occur as "transactions" over the interconnect. Transactions may contain memory addresses, although some do not. An ordinary memory transaction is one made to potentially cacheable main memory, such as a non-privileged application program might make. Other transactions include those to (non-cacheable) system control registers, and to portions of the address space used by I/O adapters; these latter may be accessed only by privileged-mode code, such as the system boot, the OS kernel, and I/O drivers. Still other transactions may be interrupts.

The multiple domains are both software- and hardware-isolated from each other. Individual subsystems may comprise system cards, boards, or other units potentially containing hardware for processing, memory, and/or I/O functions. Although not all individual system units need contain all the functions of a complete processor, the set of units forming a domain must include among them all the functions of a complete data-processing system. A single system unit may form a domain. Any system unit can belong to only one domain. A domain functions as a single data-processing system; its individual system units have no secrets from each other.

"Software isolation" means that no software running in one domain can affect software running in another domain, in the absence of a hardware failure in a subsystem. This requires that each domain have its own physical processor (s), memory units, and I/O adapters not shared with those of other domains. Domain-filter hardware between each system unit and the common address-interconnect hardware has a mask register containing a separate bit for each unit potentially in the complete system. The states of these bits indicate which other units are members of the same domain. A unit's interface responds to a transaction from the interconnect only when the transaction originated at a system unit within the same domain. Such hardware distributed among the subsystems is sufficient to ensure software isolation, as long as the hardware is controllable only by an agency outside the subsystems, such as a separate service processor.

"Hardware isolation" denotes in addition that hardware errors occurring within a domain do not affect the operation of different domains in the computer. Hardware isolation is not practical with a common bus architecture among the individual subsystems, because a failing subsystem could take the entire bus down with it. We therefore employ a switched interconnect among the subsystems, such as crossbars and/or routers. Because a hardware failure within one subsystem might possibly allow it to masquerade as belonging to a different subsystem, or to generate system-wide fatal interface signals such as control-signal parity errors, subsystem hardware isolation also requires some central control logic outside the subsystems themselves, and that at least some of the control signals be routed point-to-point between this central logic and each subsystem. If the interconnect hardware also has domain mask registers, it may produce a "valid transaction" signal to each system unit in the originator's domain; this prevents any unit from masquerading as another unit. Because all units outside the source domain ignore a transaction, they cannot generate error states for hardware error signals sourced from another domain. Although failures in the interconnect hardware itself can still possibly affect all domains, in practice the interconnect is small and rugged compared to the hardware in the subsystems.

In some applications, certain domains need high-bandwidth communications with each other by sharing one or more segments of their individually addressable memory space. The invention can provide clusters of domains having properties similar to those of individual domains. An individual system unit can be its own cluster; any single unit can be a member of only one cluster; and the cluster relation is transitive. Also, a domain is in exactly one cluster, and a cluster contains one or more domains. The requirement that a cluster relation be transitive arises from its use in sharing memory between domains. If A exports memory to domains B and C, then B and C must respond to each other's transactions on the interconnect, and thus be in the same cluster. This requirement arises from the possibility in the described system that the current value of a datum from shared memory in A may actually reside in caches in B or C; if a processor in B should write a new value to this address, then the copy in the C cache must be invalidated; to accomplish this, C must see all transactions from B.

A system unit in a cluster can share memory only with a unit in the same cluster, although it need not share memory with every other unit in the same cluster. If system unit A exports a certain range of shared addresses to unit B, then B is necessarily in the same cluster; but unit C in the same cluster as A and B need not share this address range. Any system unit in the same cluster as a unit sourcing a transaction will receive that transaction, but it need not necessarily respond to the transaction. That is, the receiving unit may filter it. In practice, multiple domains will be joined in a cluster only to share memory, and all system units in all member domains of the cluster will be configured to respond to ordinary memory transactions for a specific range of memory addresses corresponding to this shared memory, from all units in the cluster. The shared memory itself resides on one system unit within the cluster, which is said to "export" this range to domains in the cluster other than its own. (A unit always responds to all transactions from source units in its own domain. This is not "exporting" in the sense used here; that term refers only to the addition of responses to some memory transactions originating outside the domain.) Therefore, a system unit may contain cacheable memory which is not accessible from units to which it exports a different range of memory addresses. The system-control registers and I/O devices within a unit are never accessible to units in a different domain, even though these units may belong to the same cluster.

Clustering adds to the domain register on each system unit a shared-memory register, and may also include range registers indicating which addresses are to be shared—i.e., exported to at least one system unit in another domain in the cluster. The shared-memory register indicates which other units can transfer addresses to and from its unit. Thus, a system unit responds to an address in a transaction from another unit only (a) when the sourcing unit is a member of the same domain, or (b) when it is a member of the same cluster, is designated in the shared-memory register, and the address lies within the range designated to be shared (if any), and only for an ordinary memory transaction, as defined above. The domain registers in the interconnect become domain-cluster registers, capable of sending validity signals to other system units in the same cluster as the unit which sources a transaction.

DRAWING

Figure 2:
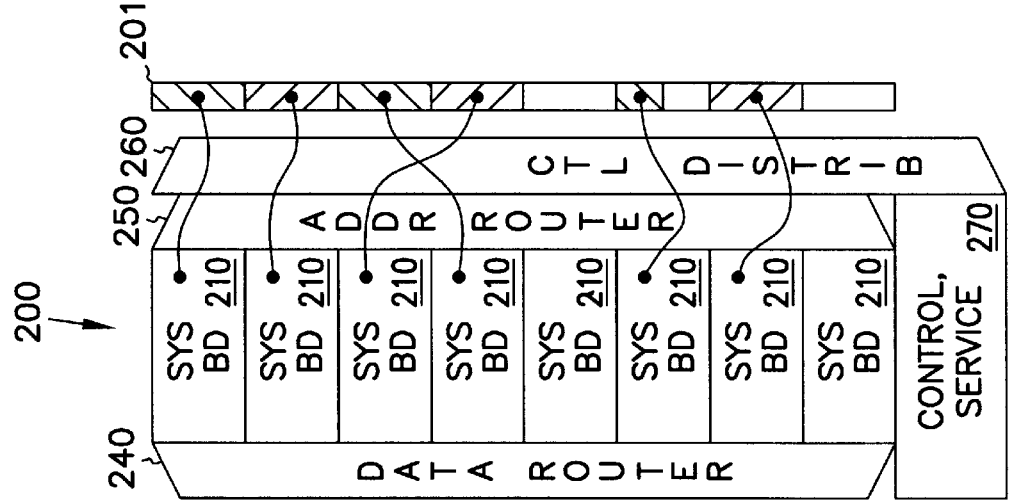
FIG. 2 is a similar schematic of a computer having multiple system units.

FIG. 3 divides the computer of FIG. 2 into system domains and clusters according to the concept of the invention.

FIG. 4 shows how the invention divides the computer of FIG. 2 into the domains and clusters of FIG. 3.

Figure 5:
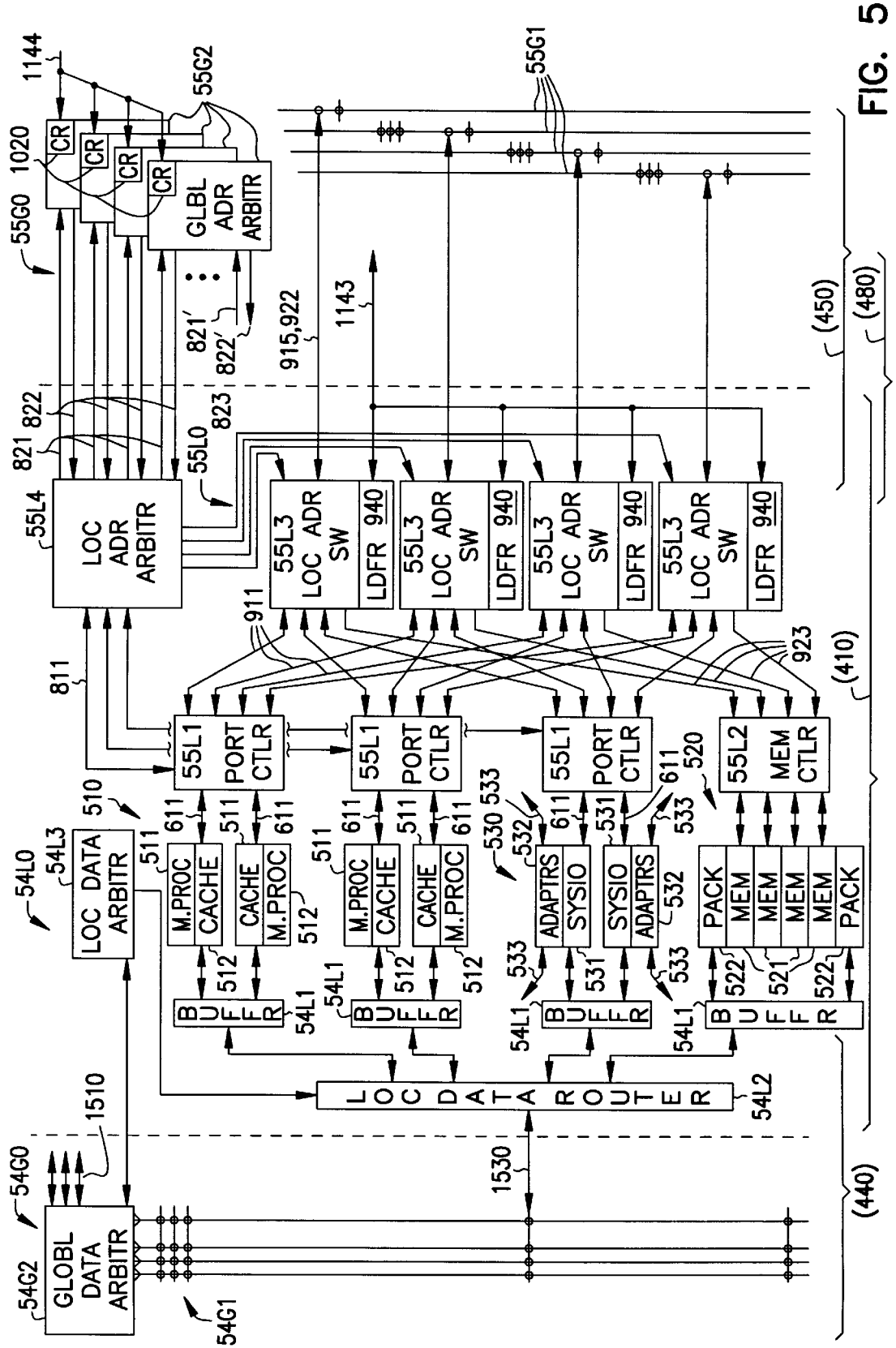

FIG. 5 is a block diagram of a fully-populated system unit of FIG. 4, including relevant portions of other computer units.

Figure 6:
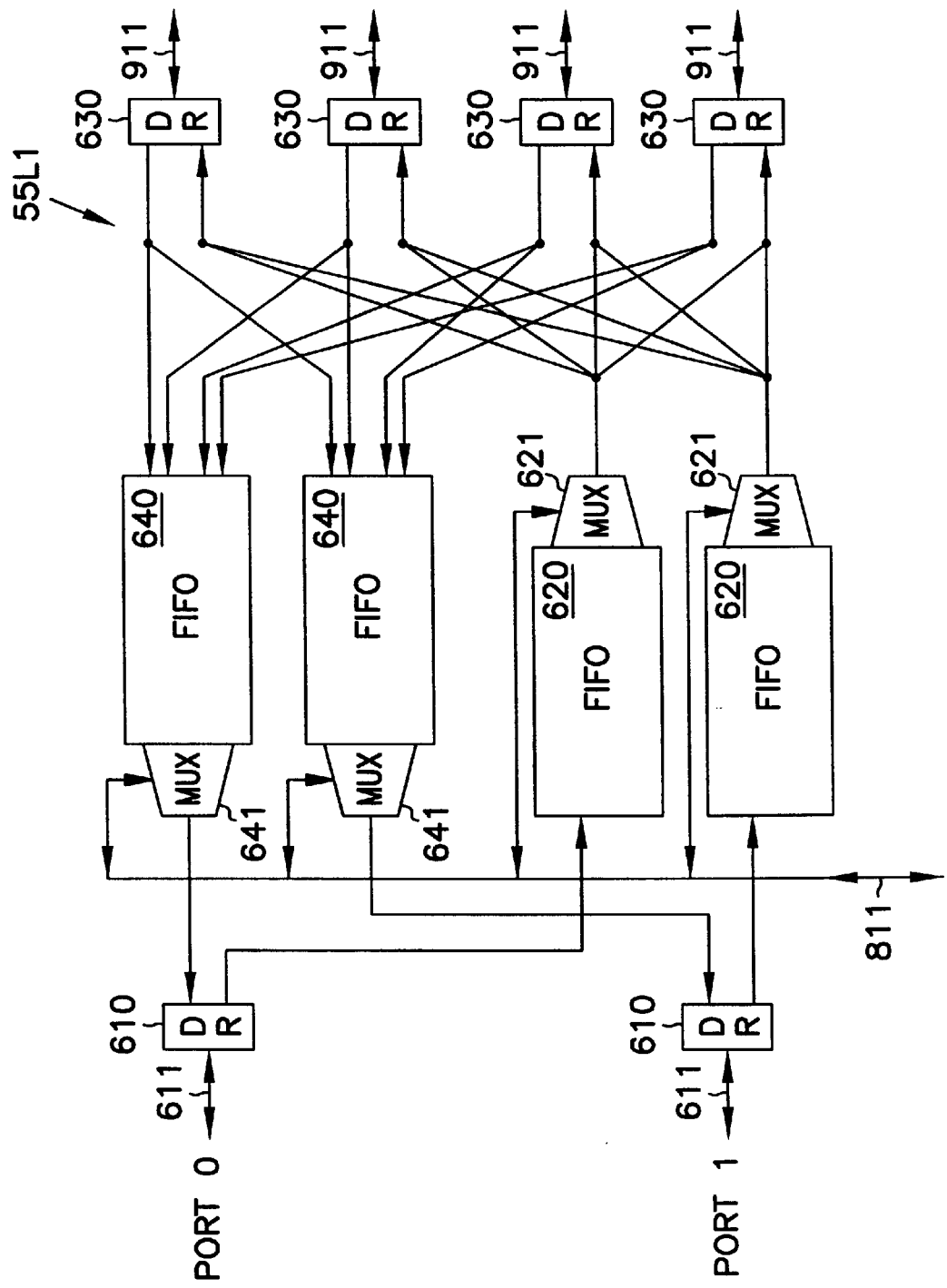

FIG. 6 details a port controller of FIG. 5.

Figure 7:
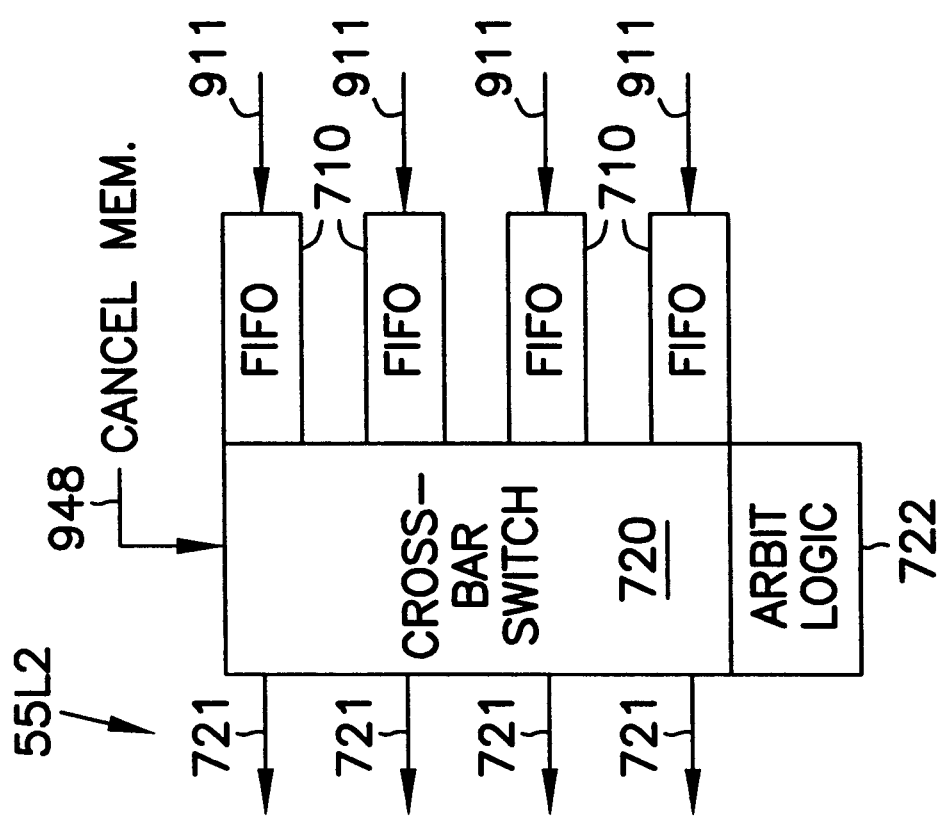

FIG. 7 details a memory controller of FIG. 5.

Figure 8:
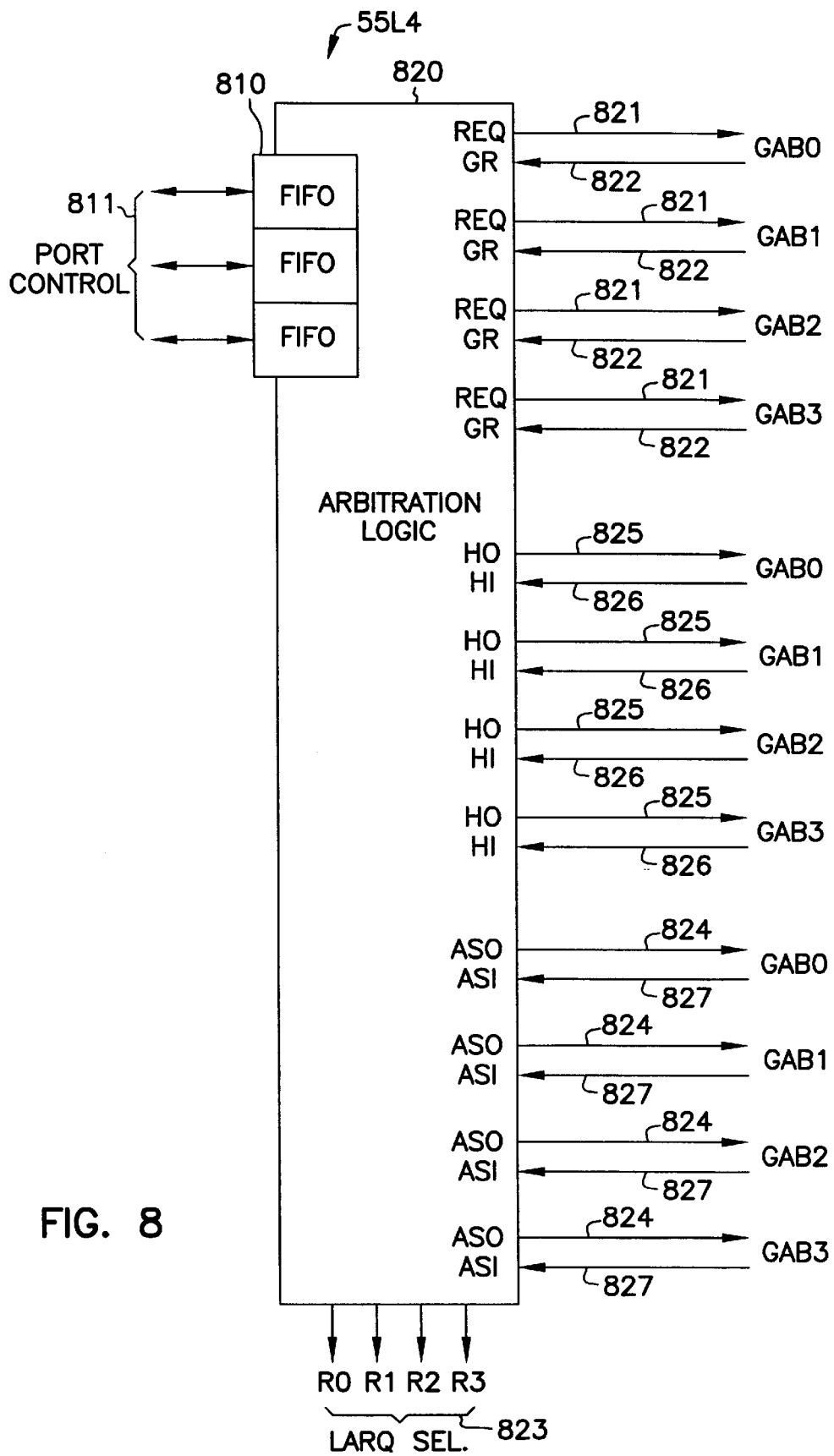

FIG. 8 details a local address arbiter of FIG. 5.

Figure 9:
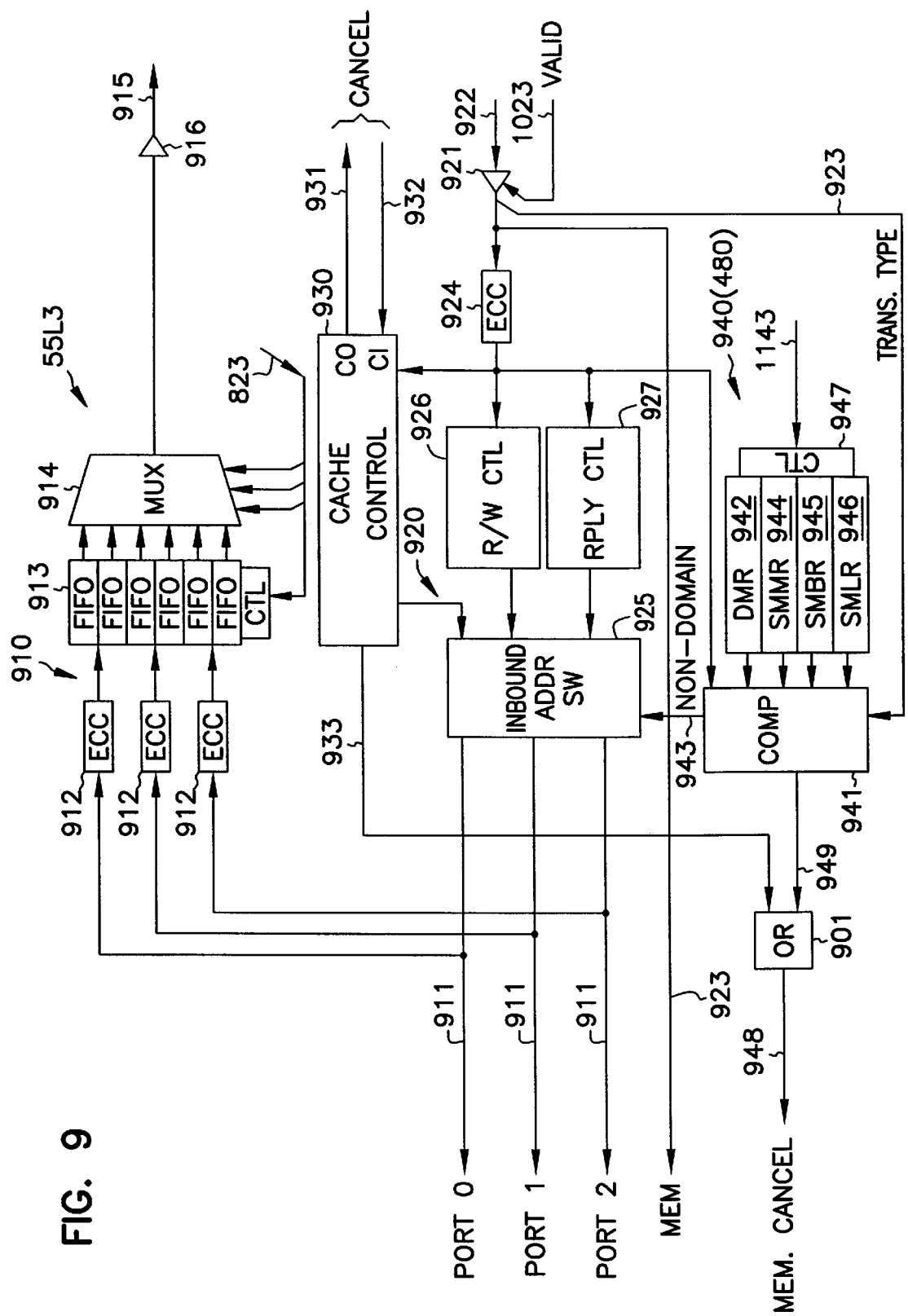

FIG. 9 details a local address router of FIG. 5, which includes a local portion of a domain filter according to the invention.

Figure 10:
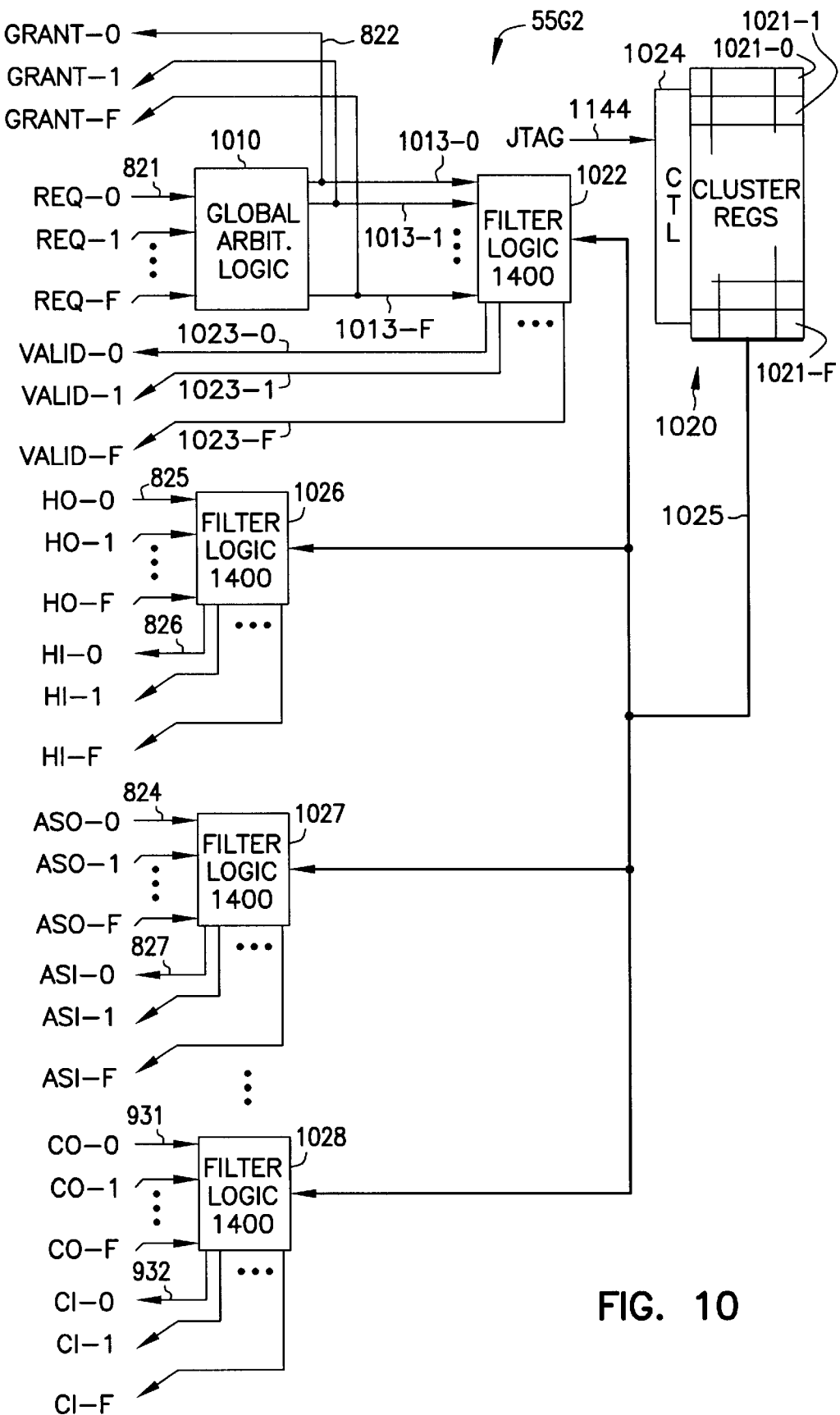

FIG. 10 details a global address arbiter of FIG. 5, which includes a global portion of the domain filter.

Figure 11:
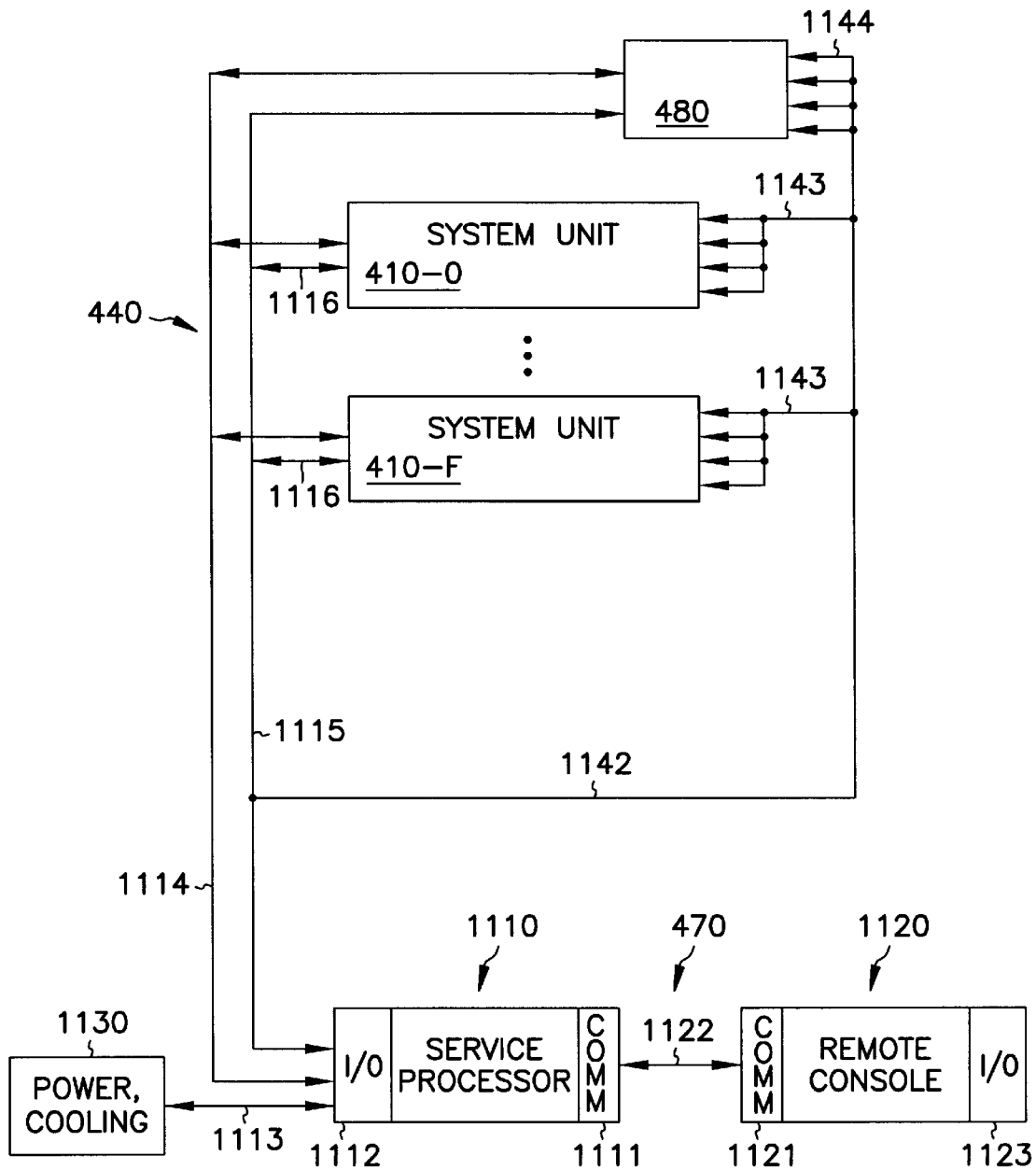

FIG. 11 shows the domain configurator of FIG. 4.

Figure 12:
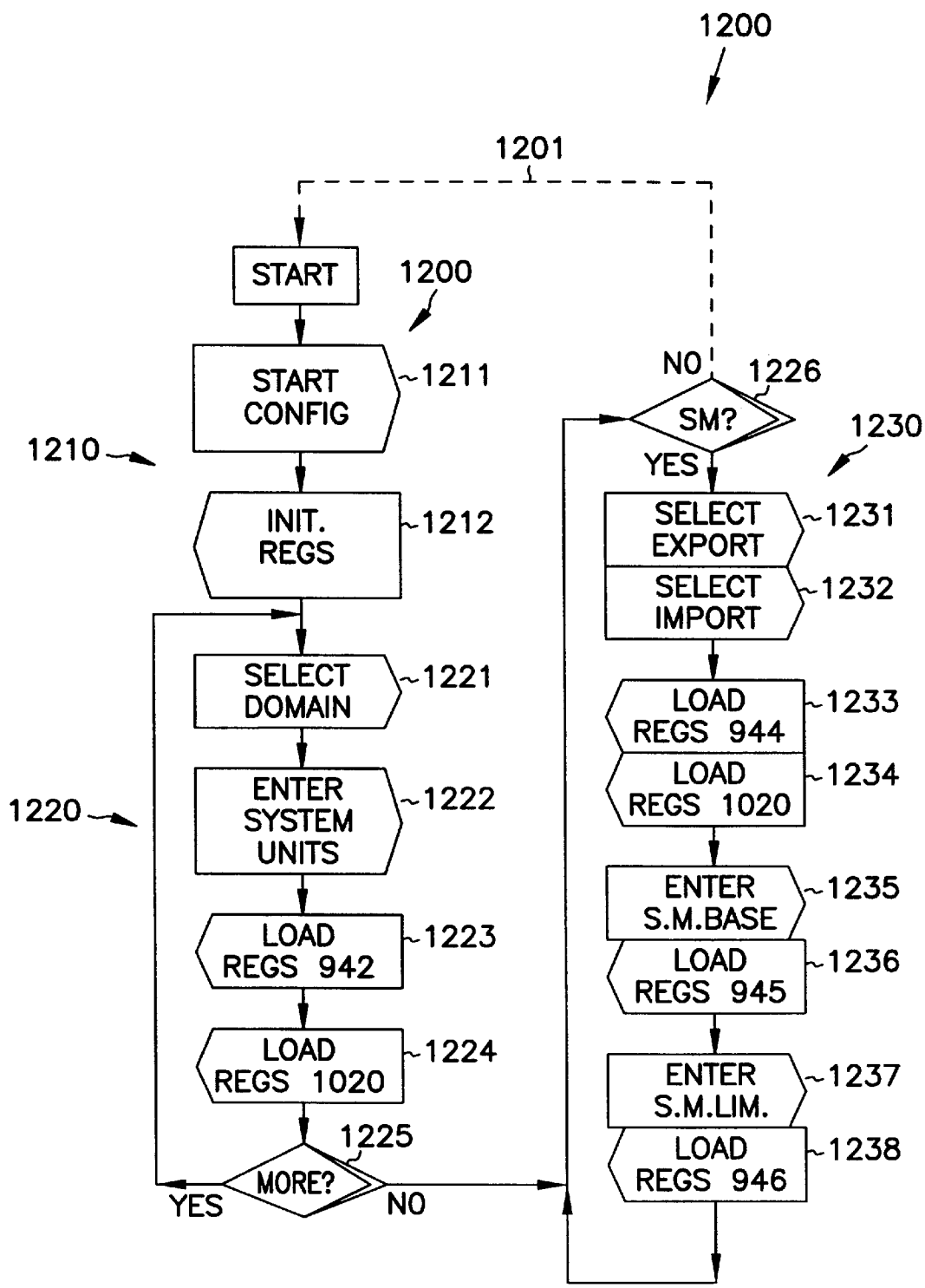

FIG. 12 is a flow chart illustrating a method of configuring a computer into clustered system domains according to the invention.

Figure 13:
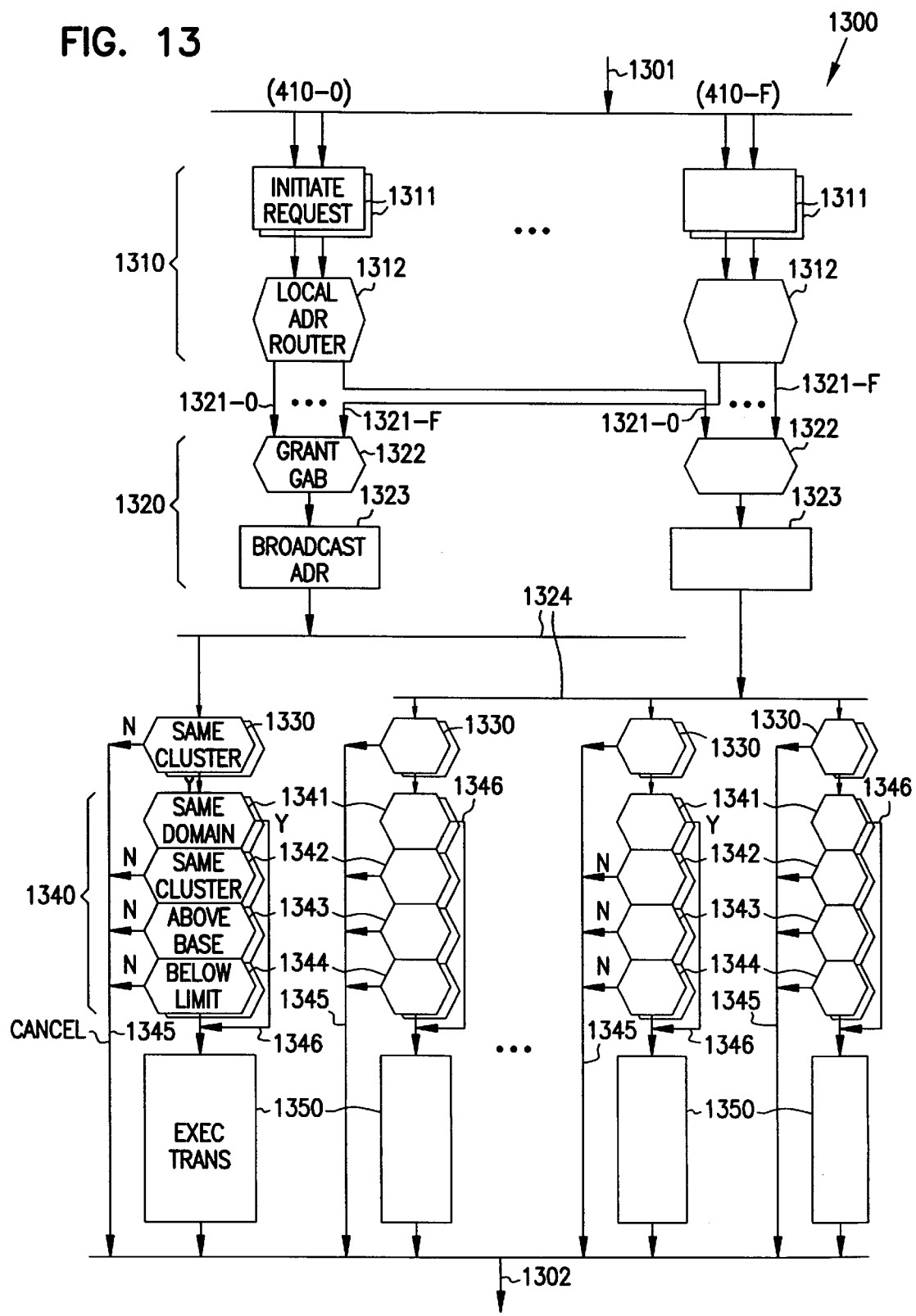

FIG. 13 is a flow chart of a transaction operation, emphasizing the domain filtering of the invention.

Figure 14:
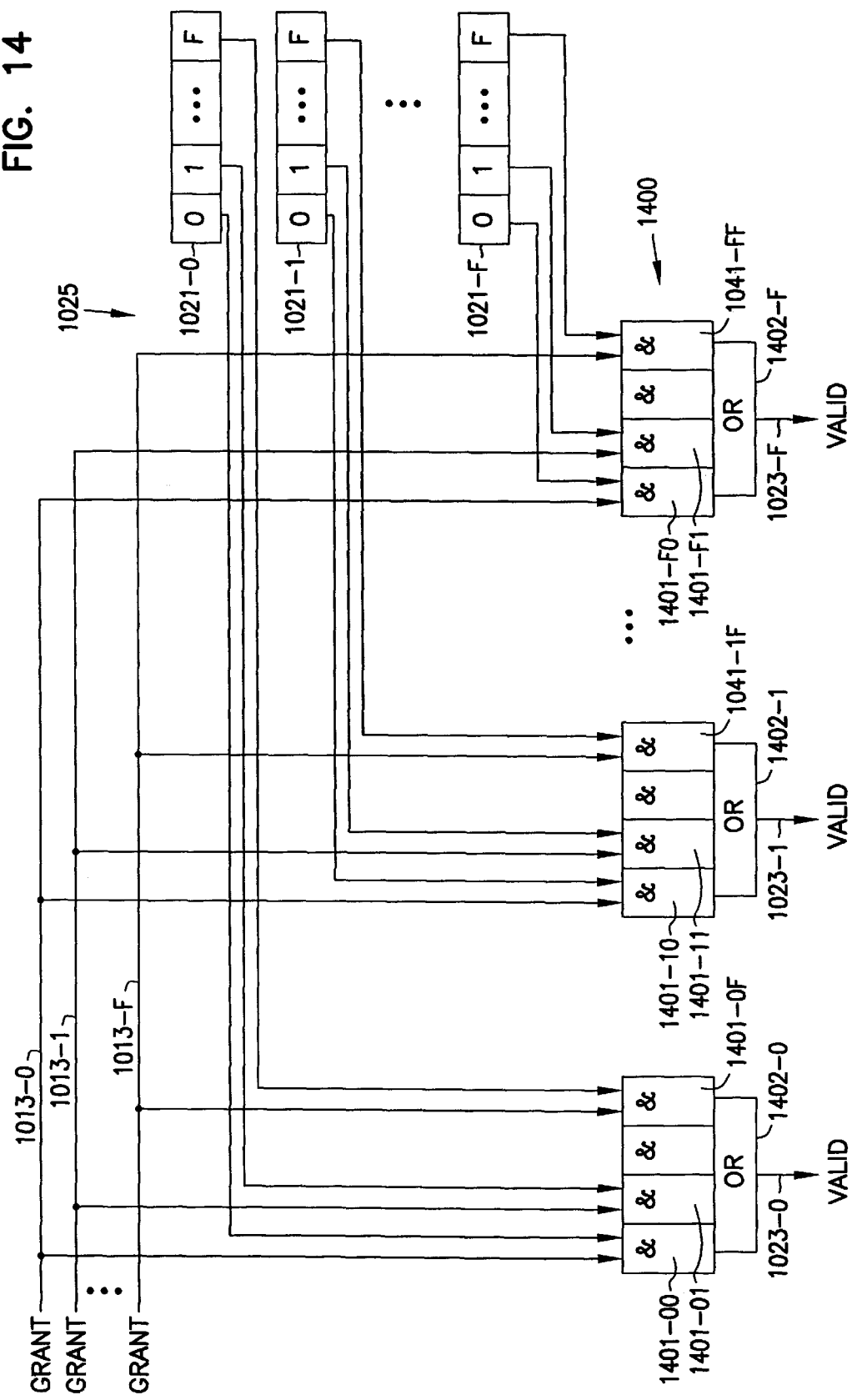

FIG. 14 describes detailed logic circuits used in the domain filter.

Figure 15:
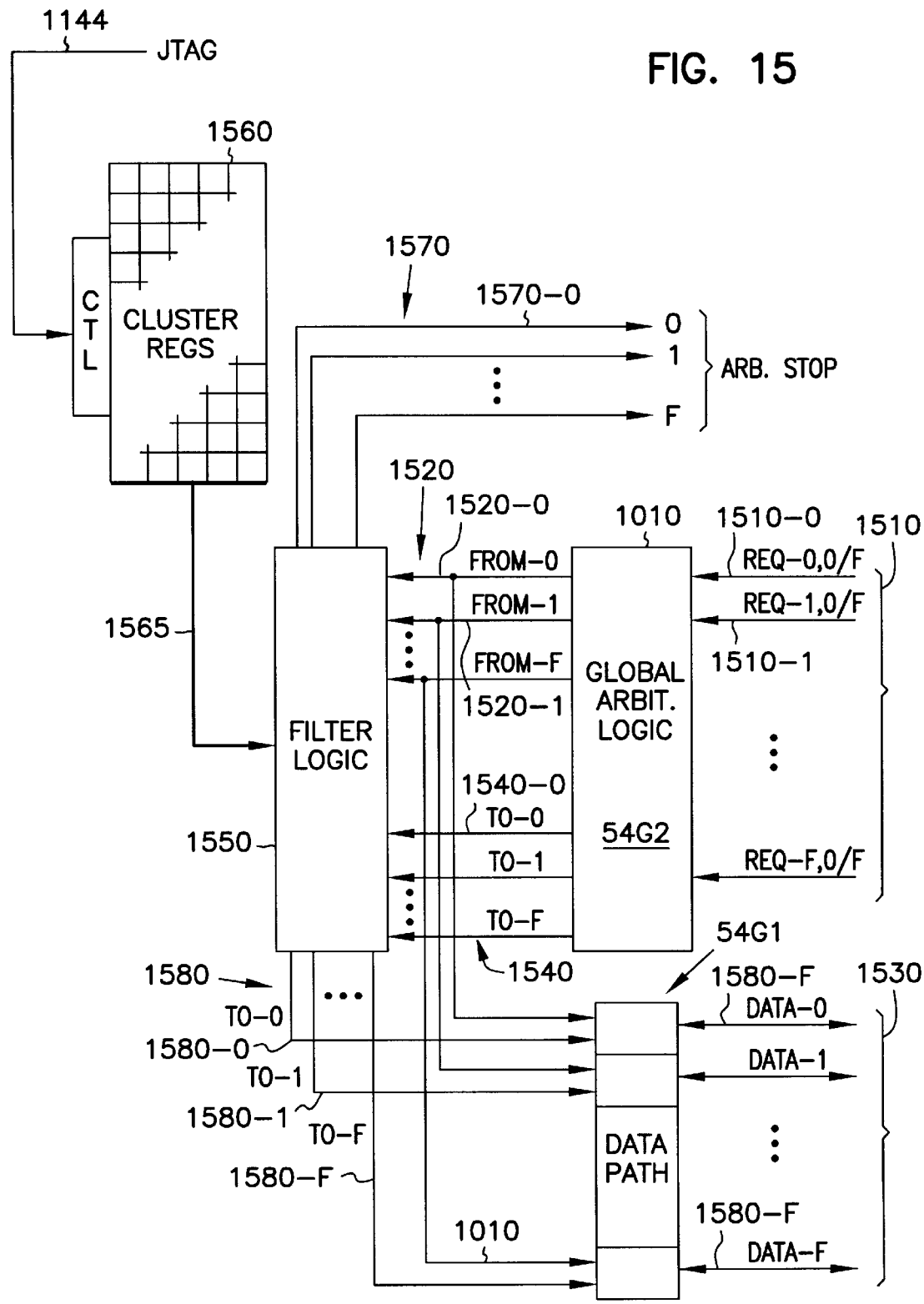

FIG. 15 details a global data arbiter of FIG. 5, including an optional further global portion of the domain filter.

DESCRIPTION OF A PREFERRED EMBODIMENT

Figure 1:
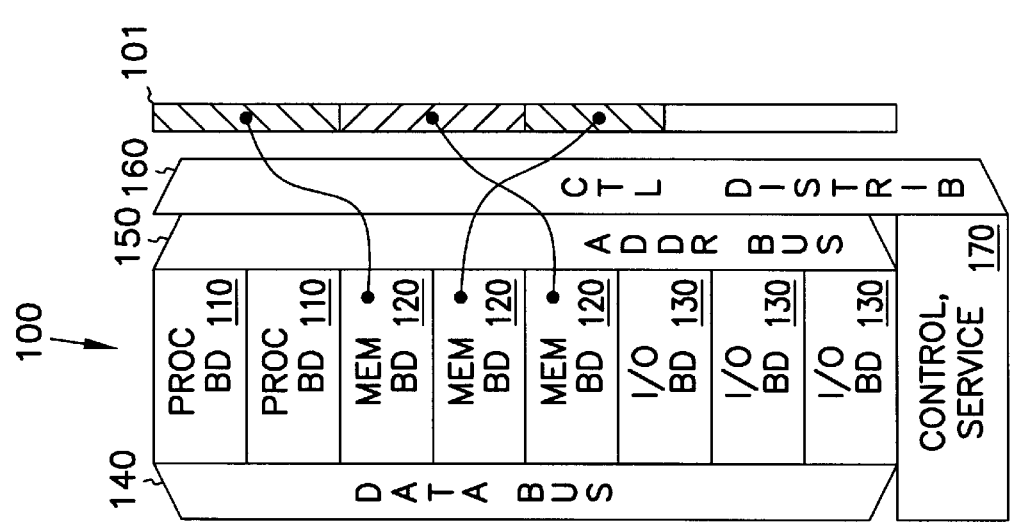
FIG. 1 is a conceptual schematic of a prior-art bus-oriented multiprocessor digital computer.

FIG. 1 shows a prior-art computer 100 having an architecture typical of a server or midrange computer. Computer 100 has processors 110 on a mother board or on plug-in boards, separate boards 120 for memory, and separate boards 130 for I/O adapters. A data bus 140 and an address bus 150 couple the different functional boards together. A control distribution bus 160 routes control signals, including error signals, to the various boards. Larger systems may have a dedicated control and service unit 170 for boot-up, diagnostics, and similar functions.

Bar 101 represents schematically the overall address space of computer 100. The processor or processors send all addresses on bus 150 to those boards or units 120 containing memory; each board has a memory responding to a certain range of addresses; each board contains different ranges of addresses, usually set by mechanical switches or registers on the memory boards. The processors 110 also communicate with all of the I/O adapters on all boards 130.

FIG. 2 illustrates a different architecture 200, one in which a number of system units 210 may each contain within itself processors, memory, and IO adapters coupled together such that the unit can potentially function by itself as a complete computer. (Some system units, however, may actually contain only processors, only memory, only IO, or some subcombination of their total potential functionality). The individual system units 210 transmit addressed data within the same unit, or to other system units within the same complex over high-speed routers 240 and 250, constructed as a centerplane interconnect structure into which the system units are plugged. A control distribution bus 260 sends control and error signals to all system units 210. Such a computer is not limited to the bus organization of a typical personal or midrange computer. For example, data and address routers 240 and 250 may be implemented as conventional point-to-point wiring, cross-point switches, or multiple arbitrated buses. The overall system 200 may be characterized as a shared-memory symmetric-multiprocessor system. Preferably, it also uses coherent caching; this feature may be realized in a number of conventional ways. The publicly available CS6400, available from Sun Microsystems, Inc., is an example of this type of machine.

Bar 201 represents the address space of computer 200. Although each system unit is potentially a complete computer by itself, the interconnections provided by address router 250 place all system units within a common overall address space. That is, the full qualified address of every memory location on each system unit 210 must differ from that of every memory location on all other units.

Error and status signals on distribution bus 260 affect every unit 210 in the system. For example, error-correcting codes correct some bit errors on router 250, and produce a fatal error signal for other errors which the codes can detect but not correct. Such a fatal-error signal generally brings the entire system to its knees even when the fault causing the error is confirmed to a single system unit or router location. A faulty system unit can assert an error signal continuously, shutting down the entire system. CANCEL (sometimes called ABORT) signals present a different situation. Some high-performance systems initiate multi-cycle operations speculatively, and cancel them when their assumptions were incorrect; assertion of a CANCEL in such a single-domain system holds up every unit in the whole system.

FIG. 3 shows a hypothetical computer 300 in which the various system boards 310, corresponding to units 210 of FIG. 2, are physically divided into a number of domains, each having its own physically separate data router or bus 340, its own address router or bus 350, and its own control distribution means or bus 360 and possibly even its own system controller 370. Computer 300 in effect becomes multiple different computers or domains S1, S2, and S3. In addition, multiple domains may share part or all of their memory addresses to form clusters, as shown by area 351 of address router 350. In FIG. 3, domain S1 is a (degenerate) cluster CA by itself, while domains S2 and S3 together form a cluster CB. The address spaces of the different clusters may overlap each other, each may run its own operating system independently of the others, and any memory faults or other hardware errors in one domain cluster do not affect the operation of other domain clusters.

Bars 301, 302, and 303 indicate that the memory address space of computer 300 may be treated as three separate spaces, some or all of whose addresses may overlap each other. In addition, some of the memory addresses may be physically shared among multiple domains, as shown at 304 and 305. The area 351 bridging the lower two address routers 350 symbolizes the memory addresses shared among different domains.

Computer 300 permits many of the control signals to be isolated from domains to which they cannot apply. A fatal error (such as an uncorrectable error in an address or control bus) in domain S1 thus produces an ARBSTOP signal on bus 360 only within that domain cluster, and allows domains S2 and S3 to continue operation. However, system 300 must be manually configured in a permanent or at least semi-permanent manner. That is, reconfiguration requires a complete system shutdown, and rewiring or manual adjustments to reposition boards or reset switches. This system cannot be dynamically or easily reconfigured into different domains and clusters having variable amounts of resource.

FIG. 4 builds upon the background of computer systems 200 and 300, FIGS. 2 and 3, to present an overview of a preferred form of the invention in an example environment. Although much of the detail described below is not directly relevant to the inventive concept per se, it is helpful in understanding how the invention functions in this environment.

Computer 400 has system units 410 corresponding to units 310 of FIG. 3. Data router 440 physically interconnects all system units 410. Address router 450 and control bus 460 physically couple all system units, just as in FIG. 2. In computer 400, however, an added domain filter 480 electronically divides computer 400 into domains and clusters capable of operating independently of each other. The placement of domain filter between router 450 and units 410 symbolizes that it acts upon addresses and control signals to achieve separation into domains. In the preferred implementation, filter 480 is physically located in chips which form parts of address router 450, and router 450 is itself physically located partly within each system unit 410 and partly in a common centerplane structure. Filter 480 may also include components located in data router 440. Domain configurator 420 communicates with filter 480 to set up the domains and clusters arbitrarily and dynamically. The example in FIG. 400 has the same memory address maps 401–403 as the corresponding maps 301–303 of FIG. 3.

Anticipating later details, the numbers beside the maps indicate addresses at various points. The numbers are in hexadecimal; in the example implementation, they run from '00 0000 0000' through '0F FFFF FFFF'. (FIG. 4 shows only eight of the possible sixteen system units, and thus includes only the first half of this space, up to address '08 0000 0000'.) The system also employs addresses '10 0000 0000' through '1F FFFF FFFF' as an alternative space, for accessing system registers and I/O devices. With a few complications not relevant to the invention, an example system architecture assigns a 4 gigabyte (GB) address range to each system unit 410. Although each range starts at the assigned unit number times 4GB, any memory actually installed on the unit may begin and end anywhere within its assigned range. Although this almost always results in holes in the address range of installed memory, system 400 deals with the situation easily. Other systems may easily implement the invention with quite different memory architectures, however.

FIG. 5 shows a system unit 410 of FIG. 4, along with the portions of the data router 440, address router 450, and domain filter 480 which are part of and coupled to that system unit. FIG. 5 does not show most of the individual control lines of distributor 460 which are managed by the domain filter of the invention; FIGS. 8–10 show and discuss representative control signals in greater detail. In this example, computer 400 has eight of a possible sixteen system units 410 installed.

System unit 410 contains the space and wiring on one physical structure, such as a circuit board, for all of the major components 110–130 of the computer 100, although not all of these need be fully or even partially stuffed in a particular unit. Processor subsystem 510 may have up to four microprocessors 511, each with its own cache 512. Input/output subsystem 530 contains two system-I/O busses 531 each controlling various conventional I/O adapters 532, which in turn couple to lines 533 to external I/O devices such as disk drives, terminal controllers, and communications ports. Memory subsystem 520 contains up to four banks of memory 521, each pair of which couple to conventional pack/unpack modules 522. As an alternative to fully generic system units, more specialized boards are feasible. For example, a first type of system unit might have wiring and locations for processor and memory subsystems only, and a second type would contain only one or more I/O subsystems.

Data router 440 passes transaction data among the subsystems 510–530; in this embodiment, the data router is physically divided between a local portion 54L0 on each system unit 410 and a global portion 54G0 located on the centerplane; in FIG. 5, label 54L0 denotes the entire local portion, having components 54L1–54L3, of data router 440; label 54G0 denotes the entire global portion, having components 54G1–54G2.

Each buffer 54L1 of local router 54L0 has a small amount of fast static RAM, capable of holding, e.g., 256 transactions. Its conventional purpose is to provide a holding queue for isolating and smoothing the flow of data against possible bursts of activity. Local data switch 54L2 is a full-duplex, bidirectional 1×4 crossbar. Local data arbiter 54L3 accepts grants from global arbiter 54G2, and instructs at most one buffer to store the corresponding transaction packet. Simultaneously, local arbiter 54L3 uses conventional fairness algorithms to select an awaiting packet from one of the buffers and to generate on its behalf a request for transmission to global arbiter 54G2. Global data router 54G0 transfers data from the LDR 54L0 of one system unit to the LDR 54L0 of the same or a different unit, using a 16×16 crossbar array 54G1 which receives sixteen sets of four-bit steering logic from arbiter 54G2. A lower level realizes this as sixteen sixteen-input multiplexers, one for each system unit.

Address router 450 passes addresses among the subsystems 510–530 on each system unit 410, and also from one system unit to another; like the data router, it has both a local portion, denoted 55L0, and a global portion, 55G0. In this implementation, address routing proceeds in the same way for both local (intrasystem) and global (intersystem) transactions. Port controllers 55L1 and memory controller 55L2 provide a conventional interface between subsystems 510–530 and the individual routing switches 55L3. For the moment, individual processors 511, I/O buses 531, and memory units 521 may be considered to be effectively connected directly to local address switches (LAS) 55L3. LASs 55L3 perform a number of conventional functions, such as cache coherency. For purposes of the present invention, their function is to route addresses from processors 511, I/O buses 531, and memory 521 in the system unit to and from global address router 55G0.

The global portion 55G0 of address router 450 in this embodiment has four address buses 55G1 shared among the sixteen system units. A separate global address arbiter 55G2 allocates each address bus to various system units 410 in response to requests for transactions from a local address arbiter 55L4 in each unit.

In this embodiment, each LAS 55L3 on a system unit connects to a different one of the four GABs 55G1, as symbolized by the open circles on lines 915 and 922. Arbiter 55L4 physically comprises four identical sections, which each communicate with a different one of GAAs 55G2 and LASs 55L3, in response to access requests from lines 811. That is, the overall function of the combined local and global portions of address router 450 is to schedule the four GABs 55G1 among contending requests from the six ports (two from each of the controllers 55L1) of all system units 410. The decisions for all four GABs 55G1 proceed simultaneously with respect to each other in the LAA 55L4 of each system unit.

FIG. 6 shows the relevant address routing within the conventional port controller 55L1 of FIG. 5. Each controller chip contains address lines and control lines to interface two processors or two I/O buses to any of four address buses. Bidirectional driver/receivers 610 route outbound transactions from lines 611 to first-in/first-out (FIFO) buffers 620. Switches 621 send the FIFO outputs to bidirectional driver/receivers 630, whence they proceed over lines 911 to local address routers 55L3, FIG. 5. Inbound transactions from lines 911 proceed from driver/ receivers 630 to FIFOs 640. Multiplexers 641 select among the stored transactions and send them to driver/receivers 610 for transmission over lines 611. Lines 811 control switches 621, multiplexers 641, and other components (not shown) within port controller 55L1. The controller components also transmit status and other information to local address arbiter 55I4, FIG. 5.

FIG. 7 shows the relevant portion of a conventional memory controller 55L2 of FIG. 5. This chip performs functions similar to those of a port controller 55L1 for four banks of DRAM memory chips 521. Lines 911 from local address routers 55L3, FIG. 5, feed transactions into FIFO storage 710. Crossbar switch 720 routes addresses from these transactions to the four memory banks over lines 721; that is, multiple banks on the same system unit 410 may read or write data simultaneously, as long as the data is located in different subranges of the memory addresses in the memory segment located in the unit. Conventional arbitration logic 722 assigns the different FIFOs 710 to the various outputs 721. Line 948 from FIG. 9 cancels memory accesses from transactions which are not to be made visible to this system unit.

FIG. 8 details local address arbiter 55L4 of FIG. 5. Each system unit 410 contains one LAA chip 55L4. Each port controller 55L1 may request a shot at one of the available global address buses 55G1, by raising a GAB request signal into a queue in FIFO buffers 810; these lines form a part of the conventional port control lines 811 shown in FIG. 5. Arbitration logic 820 selects among these requests using any of a number of conventional fairness algorithms, then raises GAB request and steering lines 821. A request line indicates whether or not logic 820 desires access to a particular global address bus. When global address arbiter 55G2 grants a request for a particular address bus on lines 822, arbiter chip 55L4 signals the appropriate LAS chip 55L3 over lines 823.

LAA 55L4 may interrupt the operation of computer 400 in a number of ways. A fatal error such as a parity error on the system unit may generate an ARBSTOP control signal on line 824; that is, the LAA acts as a generator of the ARBSTOP control signal. In a conventional computer, this signal broadcasts through control distributor 460 directly to an ARBSTOP detect line 827 in the LAA of every other system unit; thus, a fatal error in one unit conventionally shuts down every system unit of the entire computer 400, to avoid corruption of user data and to permit immediate dumps for failure analysis. As described in connection with FIG. 10, however, the present computer filters this signal so that only those system units in the same domain cluster receive an outgoing ARBSTOP signal from one of the units in the domain cluster.

A system unit may also assert HOLD control signals 825 to all other units on their corresponding detect lines. Conventionally, an outbound HOLD signal from any system unit travels directly to the corresponding inbound HOLD line 826 of every other unit, thus precluding the entire computer from requesting more transactions whenever an input queue of that system unit is saturated with pending operations. In addition, a faulty system unit 410 can bring down the entire computer by asserting HOLD continuously. FIG. 10, however, filters this signal also, so that an outgoing HOLD on a line 825 only affects the incoming HOLD 826 on system units in the same domain cluster.

Local address arbiter 55L4 thus acts as a generator of control signals, such as GAB REQ, ARBSTOP-out, and HOLD-out, which can affect the operation of other system units. It also acts as a receptor of these control signals, GAB GRANT, ARBSTOP-in, and HOLD-in, from other system units. A conventional system would merely tie outgoing control signals from all system units together and route them to the receptors of all other units; the present system, however, passes them through a domain filter, so that a signal generated in one LAA affects the LAAs of only those units in the same domain or domain cluster. As apparent below, other operational devices also act as generators and receptors of control signals which the domain filter can pass or block, according to different domain definitions.

FIG. 9 details a local address router chip 55L3, FIG. 5, concentrating upon its function as a part of domain filter 480, FIG. 4. Although its overall operation is complex and involves multiple cycles per transaction, the present purpose requires only that each address bus 55G1, FIG. 5, carry address bits and a few control signals for certain transactions.

Outbound address control 910 receives transaction addresses from each port controller 55L1 (FIG. 5) on lines 911, and routes them through error-correcting-code generators 912 to FIFO buffers 913. Multiplexer 914 selectively couples waiting addresses onto outbound global address lines 915 via drivers 916, in accordance with their priorities as established by local address arbiter 55L4 and communicated over lines 823.

Conventional inbound address switch 920 receives transaction addresses from a global address bus at receivers 921 over inbound address lines 922, whenever a VALID signal on line 1023 signals that the transaction is valid for this particular system unit 410; if this line remains inactive, LAS 55L3 treats the corresponding bus cycle as an idle cycle, and performs no action. Addresses from valid transactions proceed directly to memory controller 55L2 via line 923. Addresses from other system units proceed through ECC decoder 924 and cache-coherency unit 930 to inbound address switch 925. Some addresses proceed through read/write control 926 or reply control 927 to switch 925. Finally, switch unit 925 gates inbound addresses to the proper lines 911 to one of the port controllers 55L1.

Blocks 930 maintain coherency among caches 512, FIG. 5 in a conventional manner. Line 931 produces a CANCEL control signal from its own system unit when cache control 930 determines that an operation is to be aborted. High-performance systems may execute an operation speculatively over multiple clock-cycles, in parallel with determining whether or not the operation is to be executed at all. Should the conditions for executing the operation fail, outgoing line 931 broadcasts the CANCEL signal through control distributor 460 to the incoming CANCEL line 932 of all other system units, which causes cache control 930 to assert MEM CANCEL line 948 to memory controller 55L2, to prevent the completion of any memory operation before data can be modified. For example, memory is read from RAM while the system determines whether the current value instead resides in the cache of one of the processors. Again, domain filter 480 prevents the CANCEL-out signal 931 from one system unit from affecting the CANCEL-in lines 932 of units not in the same domain cluster, so that each cluster may operate independently of the others with respect to this and other control signals. Line 933 also cancels any on-board memory operation via line 948, as described later.

System 400 makes no distinction between transactions originating and terminating at different system units 410, and those both originating and terminating at the same unit. All transactions traverse a global address bus in the present system, because each cache controller in a domain or cluster must be aware of transactions in the cache lines of all other caches of the same group.

The local portion 940 of domain filter 480, FIG. 4, in each arbiter chip 55L3 is identical to —and always carries the same data as— the portion 940 located in all of the other chips 55L3 in the same system unit 410. However, each copy of blocks 940 receives inbound address lines 921 from a different one of the buses 55G1 via lines 921.

Comparator 941 detects matches between an address from lines 922 and each of four registers 942 and 944–946.

Domain mask register (DMR) 942 has sixteen bits, one for each of the possible system units in a computer 400. The bit position for (each copy of) each domain register in each system unit in a given domain contains a "1" bit in all the other registers of system units in the same domain. Using the example of FIG. 4, suppose that the first four system units (410-0 through 410-3) are defined as one domain, the next two (410-4 and -5) form a second domain, and the next two (410-6 and -7) comprise a third domain, and only eight of the possible sixteen system units are present. Then the domain mask registers 942 of the eight installed system units 410 contain the following values:

| Unit Number | Bit Position | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | 1 | 1 | 1 | 1 | 0 | 0 | 0 | 0 | 0 | 0 | 0 | 0 | 0 | 0 | 0 | 0 |
| 1 | 1 | 1 | 1 | 1 | 0 | 0 | 0 | 0 | 0 | 0 | 0 | 0 | 0 | 0 | 0 | 0 |
| 2 | 1 | 1 | 1 | 1 | 0 | 0 | 0 | 0 | 0 | 0 | 0 | 0 | 0 | 0 | 0 | 0 |
| 3 | 1 | 1 | 1 | 1 | 0 | 0 | 0 | 0 | 0 | 0 | 0 | 0 | 0 | 0 | 0 | 0 |
| 4 | 0 | 0 | 0 | 0 | 1 | 1 | 0 | 0 | 0 | 0 | 0 | 0 | 0 | 0 | 0 | 0 |
| 5 | 0 | 0 | 0 | 0 | 1 | 1 | 0 | 0 | 0 | 0 | 0 | 0 | 0 | 0 | 0 | 0 |
| 6 | 0 | 0 | 0 | 0 | 0 | 0 | 1 | 1 | 0 | 0 | 0 | 0 | 0 | 0 | 0 | 0 |
| 7 | 0 | 0 | 0 | 0 | 0 | 0 | 1 | 1 | 0 | 0 | 0 | 0 | 0 | 0 | 0 | 0 |
| 8-F | (these registers do not exist in the system) | | | | | | | | | | | | | | | |

Again, all four copies of register 942 in the same system unit 410 contain identical values.

Lines 922 contain signals representing the number of the particular system unit 410 which had issued the current transaction. If the corresponding bit of the receiving unit's DMR 942 is not on, then comparator 941 produces an inhibiting signal on NON-DOMAIN line 943, which prevents inbound switch 925 from passing the transaction over lines 911 to ports 55L1, FIG. 5. Comparator also produces a MEMORY CANCEL inhibiting signal on line 948, via line 949 and OR gate 901. This signal tells memory controller 55L2 to disregard addresses on lines 923, when the current transaction originates outside the domain. This effectively isolates the domain, making it insensitive to transactions occurring in other domains.

As thus far described, system units in different domains can exchange data with each other only through external I/O devices such as serial communications lines interconnected by dedicated wiring such as 533, FIG. 5. Many applications of computer 400 would be enhanced by allowing different domains to cooperate via a much faster method. To this end, domain filter 480, FIG. 4, also allows grouping multiple domains together into a cluster. Domains within a cluster may share part or all of their memory with each other. When a processor in one domain writes data into a predefined range of the address space, a processor in another domain of the same cluster can read the data. That is, different domains in a cluster have a range of shared memory. This memory can reside physically in any system unit in the cluster, and is accessible via global address router 55G0, FIG. 5, for transferring data over global data router 54G0 to and from any other system unit in any domain in the cluster.

A shared-memory mask register 944 located in each copy of the local domain filter 940 defines which system units contain physical RAM 521 to be exported to other units as shared memory in a cluster defined by cluster registers 1020 in FIG. 10. The contents of each SMMR 944 in the same system unit are the same.

Each SMMR 944 has sixteen bits, one for each of the possible system units in a computer 400; and each system unit 410 has four copies of its own SMMR, one copy for each global address bus 55G1 in computer 400. Bit position j for the SMMR in a system unit 410-i in a given cluster contains a "1" value iff unit 410-i should respond to any memory transaction from system unit 410-j. Returning to the example shown in FIG. 4, suppose that the two units 410-4 and -5 of the second domain form a cluster with the two units 410-6 and -7 of the third domain, and that unit 410-4 is to export shared memory to the domain comprising units 410-6 and -7. That is, at least some of the address numbers of memory physically installed on unit 410-4 can also be read from and written to under the same address numbers by processors on units 410-6 and -7, as though that memory had been installed on the latter units. (Again, only eight of the possible sixteen system units are present, so the values for bit positions 8-F are immaterial.) The SMMRs 944 of 410 then contain the following values:

| Unit Number | Bit Position | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 |
| 4 | 0 | 0 | 0 | 0 | 1 | 1 | 1 | 1 | 0 | 0 | 0 | 0 | 0 | 0 | 0 | 0 |
| 5 | 0 | 0 | 0 | 0 | 1 | 1 | 1 | 1 | 0 | 0 | 0 | 0 | 0 | 0 | 0 | 0 |
| 6 | 0 | 0 | 0 | 0 | 1 | 1 | 1 | 1 | 0 | 0 | 0 | 0 | 0 | 0 | 0 | 0 |
| 7 | 0 | 0 | 0 | 0 | 1 | 1 | 1 | 1 | 0 | 0 | 0 | 0 | 0 | 0 | 0 | 0 |
| 8-F | (these registers do not exist in the system) | | | | | | | | | | | | | | | |

Bit positions 8-F in all registers are "0" because their corresponding system units do not exist. Units 410-0 through -3 have no "1" values because they are in the same domain, and none of the units in that domain export any memory to the other domains. The "1" values at bits through 7 for 410-4 through 410-7 indicate that these units should respond to ordinary memory transactions from all of the units 410-4 through 410-7 to implement shared memory. The memory resides on one of these units (for example, 410-4), but the specific location is not deduceable from the SMMRs 944. The requirements for cache coherency on the shared memory dictate that all units using this shared memory see all transactions within this address range from all other units which use the shared memory.

Register 944 alone would suffice to indicate whether all or none of a system unit's memory is shared. In almost all cases, however, it is desirable to share only a designated portion of the memory among the domains of a cluster. Registers 945 and 946 specify the boundaries of an address range to be shared in a particular cluster. Each shared-memory base register (SMBR) 945 on each system unit which has access to shared memory in its cluster contains the lowest address within the total address space of computer 400 to be shared. In the example of FIG. 4, unit 4104 physically houses memory for addresses '04 0000 0000' through '04 FFFF FFFF', but exports only the memory in the highest 1 GB, i.e., from addresses '04 C0000 0000' to '04 FFFF FFFF'. Only the high-order 25 bits of the 41-bit address are actually stored in register 945, so that the granularity of shared memory is 64K bytes. Thus, the SMBRs of units 410-4 through 410-7 contain the value '004 C000'. Various ways exist to designate SMBRs which do not hold a base-address value at all; in this example, such registers hold the value '000 0000'. (The additional high-order '0' on these addresses is the address-space bit, which is '0' for a memory address, or '1' for a system address such as the addresses of registers 940 themselves.)

Similarly, each shared-memory limit register (SMLR) 946 in the same cluster contains the high-order 25 bits of the highest address of the shared address range. In this example, the SMLR of system units 410-4 through 410-7 hold the value '004 FFFF', specifying that the uppermost shared address is the same as the highest address of the physical memory on that unit, '004 FFFF FFFF'. The SMLRs of all other units hold a designated invalid value '000 0000'.

| Unit | SMBR (945) | SMLR (946) |
|---|---|---|
| 0 | 0 0    0 0 0 0 | 0 0    0 0 0 0 |
| 1 | 0 0    0 0 0 0 | 0 0    0 0 0 0 |
| 2 | 0 0    0 0 0 0 | 0 0    0 0 0 0 |
| 3 | 0 0    0 0 0 0 | 0 0    0 0 0 0 |
| 4 | 0 4    C 0 0 0 | 0 4    F F F F |
| 5 | 0 4    C 0 0 0 | 0 4    F F F F |
| 6 | 0 4    C 0 0 0 | 0 4    F F F F |
| 7 | 0 4    C 0 0 0 | 0 4    F F F F |
| 8-F | (do not exist) | (do not exist) |

Register control 947 permits control lines 1143 to load different values into registers 942, 944, 945 and 946. This allows dynamic reconfiguration of the system units 410 in domains and clusters, and of the location of each cluster's shared memory. FIGS. 11 and 12 will describe how this function occurs. Placing additional copies of base and limit registers 945 and 946 in each register set 940 would allow multiple ranges of shared addresses within a single domain cluster, if desired. Registers may alternatively store base addresses and shared-segment sizes, or other parameters.

It would be possible to use NON-DOMAIN line 943 to inhibit or block transactions from non-shared memory, just as it inhibits other transactions from outside the domain. While this arrangement would permit rapid control of non-memory transactions, memory filtering requires more time in comparator 941. Because latency in memory subsystem 520 is more critical than latency in other subsystems of FIG. 5, comparator 941 preferably also receives a conventional signal from lines 922 indicating the type of the current transaction. If line 923 specifies a non-memory transaction, line 943 inhibits lines 911 as previously described; but an ordinary memory transaction will not be filtered at this point, and will proceed to memory subsystem 520, where preparations will commence for its execution. However, comparator 941 activates MEMORY CANCEL line 948 for any ordinary memory transaction originating from a system unit outside this unit's domain (as defined by DMR 942), which registers 945 and 946 indicate lie outside the range of memory shared with another domain, or which originates from a system unit not indicated in SMMR 944. This line 948 then blocks the transaction directly at switch 720, FIG. 7, preventing the transaction from having any actual effect upon data stored in any of the banks 521 in FIG. 5 even though a part of its processing has already commenced.

Thus far, computer 400 has achieved "software isolation" between domains and clusters. Different domains may run entirely different operating systems, for example, without interfering with each other. It remains to provide "hardware isolation" in the computer, so that hardware error signals from control bus 460, FIG. 4 cannot crash the entire system when the error affects only the operation of a system unit in another domain cluster. For example, an error detected by an ECC block 924 in system unit 410-0 should not affect a system unit such as 410-5, because their hardware units otherwise run independently of each other, and a hardware failure in one unit can have no effect upon any operation running in the other.

FIG. 10 details one of the four global address arbiters 55G2 of FIG. 5, which includes one of four identical global portions of domain filter 480, FIG. 4. Assume that arbiter 55G2 in FIG. 10 controls a first, 55G1-0, of the four global address buses (GABs) 55G1. This arbiter receives one of the four GAB-request line 821 from local address arbiter (LAA) 820, FIG. 8, located on each of the system units 410 in computer 400. Whenever LAA 55L4 has decided which port on its system unit deserves the next access to each of the four global buses, its line 821 asserts a request to broadcast a transaction via the GAB controlled by arbiter logic 1010. Because computer 400 has four GABs 55G1, four separate lines 821 run from each local arbiter 55L4 to the four global arbiters 55G2.

Arbitration logic 1010 uses any of a number of conventional algorithms to allocate transfer cycles of its GAB 55G1 (FIG. 5) to the LAA 55L4 of one of the sixteen system units 410, by raising one of the sixteen grant lines 1013. As in a conventional system, the grant signal returns directly to each of the system-units' LAA 55A over lines 822, FIG. 8. Disregarding filter logic 1022 for the moment, the address transaction sourced by a selected LAS 55L3 propagates over its GAB 55G1 to the corresponding LASs on all sixteen system units. In the next transfer operation of global address router 450, global address arbiter 55G2 commands the selected LAA 55L4 to signal the local address switch 55L3 to gate an address onto its corresponding GAB 55G1. The GRANT lines 1013 of the successful transaction indicate to all system units which of them is to source the transaction on that GAB 55G1. The receiving system unit identifies the source unit from information in the transaction itself, when it receives the transaction. Local data router 54L2 negotiates with data arbiters 54L3 and 54G2, FIG. 5, which of the global data paths 54G1 is to carry any data required by the successful transaction.

In the multi-domain computer according to the invention, a global portion of domain filter 480 physically accompanies each global address arbiter 55G2. A bank 1020 of cluster registers 1021, one for each of the sixteen possible system units 410, receives the sixteen grant-signal lines 1013. Each individual cluster register 1021-i has one bit position 1021-i-j for each of the sixteen system units 410-j. A "1" value in the "unit-3" position of the first register 1021-0, for example, indicates that system unit 410-3 is in the same cluster with system unit 410-0. The table below illustrates the contents of registers 1021 for the example configuration described above.

| Register Number | Bit Position | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | 1 | 1 | 1 | 1 | 0 | 0 | 0 | 0 | 0 | 0 | 0 | 0 | 0 | 0 | 0 | 0 |
| 1 | 1 | 1 | 1 | 1 | 0 | 0 | 0 | 0 | 0 | 0 | 0 | 0 | 0 | 0 | 0 | 0 |
| 2 | 1 | 1 | 1 | 1 | 0 | 0 | 0 | 0 | 0 | 0 | 0 | 0 | 0 | 0 | 0 | 0 |
| 3 | 1 | 1 | 1 | 1 | 0 | 0 | 0 | 0 | 0 | 0 | 0 | 0 | 0 | 0 | 0 | 0 |
| 4 | 0 | 0 | 0 | 0 | 1 | 1 | 1 | 1 | 0 | 0 | 0 | 0 | 0 | 0 | 0 | 0 |
| 5 | 0 | 0 | 0 | 0 | 1 | 1 | 1 | 1 | 0 | 0 | 0 | 0 | 0 | 0 | 0 | 0 |
| 6 | 0 | 0 | 0 | 0 | 1 | 1 | 1 | 1 | 0 | 0 | 0 | 0 | 0 | 0 | 0 | 0 |
| 7 | 0 | 0 | 0 | 0 | 1 | 1 | 1 | 1 | 0 | 0 | 0 | 0 | 0 | 0 | 0 | 0 |
| 8 | 0 | 0 | 0 | 0 | 0 | 0 | 0 | 0 | 1 | 0 | 0 | 0 | 0 | 0 | 0 | 0 |
| 9 | 0 | 0 | 0 | 0 | 0 | 0 | 0 | 0 | 0 | 1 | 0 | 0 | 0 | 0 | 0 | 0 |
| A | 0 | 0 | 0 | 0 | 0 | 0 | 0 | 0 | 0 | 0 | 1 | 0 | 0 | 0 | 0 | 0 |
| B | 0 | 0 | 0 | 0 | 0 | 0 | 0 | 0 | 0 | 0 | 0 | 1 | 0 | 0 | 0 | 0 |
| C | 0 | 0 | 0 | 0 | 0 | 0 | 0 | 0 | 0 | 0 | 0 | 0 | 1 | 0 | 0 | 0 |
| D | 0 | 0 | 0 | 0 | 0 | 0 | 0 | 0 | 0 | 0 | 0 | 0 | 0 | 1 | 0 | 0 |
| E | 0 | 0 | 0 | 0 | 0 | 0 | 0 | 0 | 0 | 0 | 0 | 0 | 0 | 0 | 1 | 0 |
| F | 0 | 0 | 0 | 0 | 0 | 0 | 0 | 0 | 0 | 0 | 0 | 0 | 0 | 0 | 0 | 1 |

Registers for all sixteen possible system units are always implemented. The values in registers 1021-8 through 1021-F, corresponding to system units not installed in FIG. 4, are immaterial. However, assigning a "1" to all diagonal bit positions (i.e., position i of register i), and assigning "0" elsewhere, permits hot-plugging a system unit into computer 400 and running standalone diagnostics immediately, without interfering with any other units already in the system.

Filter logic 1022 couples grant lines 1013 to lines 1023 in accordance with the cluster definitions in registers 1021. Each line 1023 travels to its corresponding system unit 410 as a "global address valid" (VALID) signal 822. In a conventional system such as 300, FIG. 3, a VALID signal is merely a timing signal indicating that the transaction currently on the bus is good, and is broadcast to all system units. In the present system 400, on the other hand, multiple system units in different clusters may carry the same addresses; the recipient in the same cluster as the source must receive that transaction, while system units in other clusters must remain wholly ignorant that any transaction at all is taking place, even though it may carry an address corresponding to that system unit.

In a conventional, single-domain computer, a HOLD signal 825 from any LAA 55L4, FIG. 8, would merely be propagated to the lines 826 for that GAB in the LAA 55L4 in every other system unit 410 of the entire computer. In computer 400, however, another filter-logic set 1026 on each GAA chip 55G2 allows a HOLD signal 825 to reach only those lines 826 belonging to other system units in the same hardware group, as defined by cluster registers 1020. The ARBSTOP signals 824 operate similarly. Rather than merely being connected to the inbound ARBSTOP lines 826 for all other LAAs, a STOP asserted by one system unit reaches only those other units specified by registers 1020. This global portion of domain filter 480 contains respective sets of filter logics for other control signals as well. For example, a CANCEL signal 931 asserted by a cache controller 930, FIG. 9, of any system unit can cancel a transaction via the inbound CANCEL lines 932 only when filter logic 1028 permits it to do so. All of the filter logics, such as 1022 and 1026–1028, connect in parallel to cluster registers 1021 via lines 1025.

Control unit 1024 permits lines 1144 to load registers 1021 with different values, in order to reconfigure the cluster definitions dynamically. As an implementation choice, each global arbiter 55G2 occupies an identical integrated circuit, each of which includes a duplicate set of cluster registers and filter logics. All sets of cluster registers are loaded with identical sets of stored values.

FIG. 14 shows a detailed circuit 1400 implementing one set of domain-filter logic such as 1022 or 1026–1028. FIG. 14 uses logic 1022 as a paradigm, showing the signal designations for that instance of circuit 1400. For ease of exposition, FIG. 14 also shows the cluster registers 1021 themselves, rather than only their bit lines 1025.

Line 1023-0 asserts a VALID signal to system unit 410-0 whenever any system unit within its hardware domain cluster initiates a transaction. GRANT signal 1013-0, associated with unit 410-0, satisfies AND gate 1401-00 when bit 1021-0-0 of register 1021-0 contains a "1" value, indicating that unit 410-0 is in its own cluster. Logic OR gate 1402-0 then asserts output 1023-1, which returns it to system unit 410-0. Assertion of GRANT line 1013-1 from system unit 410-1 also raises line 1023 for unit 410-0 if these two units are in the same cluster. If they are, a "1," value in bit 1 of register 1021-0 (called bit 1021-0-1 for simplicity) satisfies AND gate 1401-01 and OR 1402-0 when 1013-1 rises. The fourteen remaining AND gates in this bank operate similarly for register bits 1021-0-2 through 1021-0-F.

Gates 1401-10 through 1401-1F and 1402-1 function in a similar matter to produce VALID signal 1023-1 to system unit 410-1 whenever a system unit in the same domain cluster proposes a transaction. Fourteen additional banks of gates handle the remaining lines through 1023-F. Normally, the contents of registers 1021 form a diagonal matrix, so that bit 1021-i-j always has the same value as bit 1021-j-i. Also, each unit is normally a member of its own cluster, so that all main-diagonal bits 1021-i-i are always "1".

FIG. 11 shows the manner in which configurator 420, FIG. 4, dynamically sets up domains and clusters within computer 400.

Conventional control and service unit 470, FIG. 4, takes the form of an already available dedicated service processor 1110 communicating with a standard workstation 1120, which functions as a remote console. These two units communicate with each other via standard adapters 1111 and 1121, coupled by a cable or other link 1122. Console 1120 may also be connected to its own input/output devices (not shown) by adapters 1123. I/O adapters 1112 of the service processor sense and control a number of functions within computer 400. Lines 1113, for example, interface to the power and cooling subsystems 1130 for the entire computer. Lines 1114 connect to a number of lines in controldistribution means 440, FIG. 4.

One of the conventional functions implemented in computer 400 is the ability to perform tests on its logic circuits by means of stored test patterns sent through a set of lines 1115 to various elements, as indicated at 1116. The conventional function of these lines is to implement boundary-scan tests, as described in references such as K. P. Parker, *THE BOUNDARY-SCAN HANDBOOK* (Kluwer Academic Publishers, 1992). Those in the art usually refer to this protocol as the "JTAG standard."

Configurator 420 coopts the already existing JTAG lines 1115 for an additional function. Normally, these lines provide conventional address and data lines to many chips throughout the entire computer 400 for the purpose of testing the functions of these chips. Control logic 947, FIG. 9, and 1024, FIG. 10, within the chips for LAS 55L3 and GAA 55G2 detect certain predetermined signal combinations on JTAG lines 1143 and 1144. These lines then carry domain and cluster specifications to lines 1143 for loading the contents of filter registers 940 in local address routers 55L3 of selected system units 410, as shown in FIGS. 5 and 9. Lines 1142 also carry cluster specifications to lines 1144 for loading filter registers 1020 associated with global address arbiters 55G0, as shown in FIGS. 5 and 10. Systems 400 which do not have JTAG or other such lines already in place may easily employ dedicated lines from service processor 1110 to serve as control lines 1143 and 1144, or to switch some other lines to perform the configuration function; these lines merely happen to be easily available in this particular implementation. Another alternative is to treat registers 940 and 1020 as a small block of memory within a system memory space; as noted above, computer 400 has such a space from addresses '10 0000 0000' to '1F FFFF FFFF' in its total range.

The form of service processor 470 is not at all critical; it might even be possible in some cases to use a part of the normal system itself for this function, without having a physically separate entity. In fact, the preferred computer 400 allows system units themselves to provide some of the functions of a domain configurator when desired. Privileged software within the operating system running in a system unit 410 may also write to the shared-memory registers 945 and 946, FIG. 9, to respecify shared-memory blocks on the fly. The service processor might also selectively enable system units to write register 944 by setting a configuration bit in a status word in I/O controller 1112, which then appears on one of the control lines 1114.

FIG. 12 describes a method 1200 for dynamically configuring domains and clusters in computer 400. Those blocks pointing toward the right in FIG. 12 execute in remote console 1120; blocks pointing left run in service processor 1110, FIG. 11, in the embodiment described. Blocks 1210 set up the configuration process. Block 1211 starts the configuration mode in response to an operator's command. Block 1212 initializes registers 940 and 1020 to default values. Preferably, all registers 942 receive a "1" bit in the position which places themselves in their own domain, and "0" elsewhere. All registers 944–946 receive values indicating that no shared memory is exported. Registers 1020 preferably contain "0" except for a diagonal stripe of "1" bits which indicate that each system unit is in a cluster by itself.

Blocks 1220 set the configuration of domain filter 480, FIG. 4. In block 1221, an operator at the remote console selects a particular domain to configure, and enters the numbers of the system units 410 belonging to that domain in block 1222. Service processor 1110 then sends signals on lines 1115 and 1142 to load the proper values into domain mask registers 942, FIG. 9, in block 1223. Block 1224 sets the appropriate registers 1020 to make each domain its own cluster; although this step may occur at any time, it is necessary, in this embodiment, to set the cluster registers even when domains are not combined into clusters. Block 1225 returns control to block 1221 if the operator has specified additional domains to be configured. Otherwise, block 1226 asks whether there are any multi-domain clusters to be set up.

If so, blocks 1230 set up any desired shared memory. In block 1231, the operator selects one of the system units 410 which is to export memory, and block 1232 selects which domain is to import that memory. (A system unit "exports" memory when its physically installed memory is made available to another system unit, which "imports" that memory as though it were located on the importing unit.) Block 1233 loads the appropriate registers 944 as explained in connection with FIG. 9. Block 1234 sets the appropriate bits in registers 1020, as explained in connection with FIG. 10. Block 1235 receives a value for the base address of the shared memory range from the operator; block 1236 enters this into the proper SMB registers 945. Block 1237 receives the corresponding limit address value, and block 1238 loads it into the SMLRs 946. If the operator wishes to define additional clusters, block 1226 returns control to block 1231. Otherwise, procedure 1200 ends. A large number of variations in the sequence of the steps shown in FIG. 12 are possible. Likewise, the timing of routine 1200 with respect to other tasks on the computer is not critical. Also, privileged software in computer 400 may run routine 1200 instead of an operator. Dashed line 1201 indicates symbolically that reconfiguration may be performed repeatedly, either by an operator or by software, without any manual changes to the computer hardware.

Although system units 410 can arbitrarily combine into domains, obviously all domains and clusters must include at least one system unit which has at least one processor installed, and one which contains memory. A domain or a cluster almost always contains some I/O facilities on one or more of its system boards. How these resources are apportioned among the various system boards in a domain or cluster, however, is arbitrary. Method 1200 may configure domains and clusters during normal operation of the entire system 400 and its operating system(s). To avoid complexity and the possibility of subtle errors, it is prudent to permit reconfiguration only when the system is in a special state before any of the operating systems are booted.

FIG. 13 is a simplified diagram of a typical transaction 1300, emphasizing the effects of domains and clusters in computer 400 during normal operation: that is, after block 1242, FIG. 12, has completed configuring computer 400. Transaction 1300 assumes that computer 400 contains its maximum complement of sixteen system units. A transaction begins at line 1301.

Blocks 1310 occur on all system units 410, as symbolized by the multiple columns in FIG. 13. They initiate a request for a transaction, either between two different system units or within the same unit. Requests proceed asynchronously and concurrently whenever any one or more ports of one or more system units requests a transaction at any of the blocks 1311. In blocks 1312, local arbiter 55L4 selects one of the requesting ports on a system unit to proceed, based upon any of a number of traffic-equalizing priority algorithms.

Blocks 1320 transmit the addresses for all transactions. As indicated by lines 1321-0 through 1321-F, each block 1322 receives transaction requests from all system units, 410-0 through 410-F, and grants one of the buses 55G1 to the system unit. Each of the four global address arbiters 55G2 performs block 1322 in parallel, using a standard fairness method to allocate its particular bus 55G1 among the contending transactions. Block 1323 then broadcasts the address from the system unit selected by its block 1322 to all sixteen system units, as indicated by lines 1324. Again, each of the four buses 55G1 in this implementation may broadcast a separate address concurrently with any other such bus.

Step 1330 filters the transactions on each bus 55G1 so that only the appropriate system units 410-0 through 410-F are permitted to act upon them. Separate blocks 1330 exist for each global address bus for each system unit; thus the present embodiment has 4×16=64 blocks 1330. Each block 1330 determines simultaneously from registers 1020 whether its system unit is within the same cluster as the sending unit for the transaction on its bus. (Recall that a single domain by itself is also defined as a cluster in registers 1020.) If not, the system unit ignores the transaction, and control passes to output 1302; otherwise, control passes to 1340.

A separate set of blocks 1340 appears for each global address bus in each system unit, or 4×16=64 sets of blocks. Blocks 1341 read the source unit's number from the transaction itself on GAB 55G1 as it travels along lines 922 to comparator 941, FIG. 9. If a domain mask register 942 reveals that the source unit is not in the same domain as the unit in which it is located, block 1341 passes control to block 1342. If shared-memory register 944 detects that its system unit shares memory with the source unit, block 1342 moves to block 1343. If a comparator 941 shows that the address of the transaction carried on lines 922 exceeds the base address stored in register 945, then block 1344 tests whether that address lies below the shared-memory upper limit stored in register 946. For each set of blocks 1330 which indicate that its system unit is not involved in the current transaction, exit 1345 concludes the transaction at that location. But any chain of filter blocks 1330–1340 which senses the same domain, or the same cluster and the appropriate address range, causes line 1346 to pass control to block 1350 for that system unit.

Blocks 1350 execute the actual transaction from the requesting system unit to the proper destination within the target unit, including any required data transfer through data router 440. (As noted earlier, there are many different types of transactions.) Point 1302 marks the completion of the transaction. At any given point in time, several different transactions may be in progress in the same or different blocks of flowchart 1300, each proceeding independently of the others.

FIG. 15 shows an additional domain filter which can be added to the preferred embodiment to prevent another type of hardware fault from affecting system units outside their own domain cluster. Domain filter 480 as thus far described limits the effects of errors in a system unit 410 or an address router 55G0, FIG. 5, from affecting other system units which are not in the same domain cluster.

As described in connection with FIG. 5 and elsewhere, a transaction may involve the transfer of data from one system unit to another on global data router 54G0. Global data arbiter receives conventional signals 1510 from all system units. For example, lines 1510-0 from the local data arbiter 54L3 of system unit 410-0 may request a transfer from that unit 410-0 to a particular one of the units 410-0 through 410-F, FIG. 4. Lines 1510-1 designate which system unit 410-0 to 410-F is to receive a transfer from unit 410-1, and so forth. Arbitration outputs 1520 establish a data path by allowing data from one of the data lines 1530 to flow to another of the lines 1530. For example, if logic 54G2 grants the request of lines 1510-0 to transport data from unit 410-0 to 410-1, then FROM-0 line 1521 couples data bus 54G1 to lines 1530-0, and TO-1 line 1540-1 would be coupled directly to TO-1 line 1580-1, enabling lines 1530-1 to pass the data out to unit 410-1.

Under normal conditions, this arrangement is transparent to the domain structure of computer 400. However, a fault which mistakenly sends data to the wrong system unit (one not in the same domain cluster) can disrupt the operation of the system units in the other cluster. For instance, suppose that unit 410-0 in FIG. 4 attempts to send data to unit 410-3 in the same domain S1, but an erroneous signal sends it instead (or additionally) to unit 410-7. Such a fault allows domain S1 to affect the operation of domains S2 and S3, bypassing the separation enforced by domain filter 480. This is called a "transgression error."

Further filter logic 1550 eliminates this possibility by signaling an attempted out-of-cluster data transfer. Another set of cluster registers 1560, identical to registers 1020, FIG. 10, holds a copy of the cluster definitions of computer 400, and passes them to logic 1550 via lines 1565. Logic 1550 is constructed of AND/OR circuits in a manner similar to that of filter logic 1400, FIG. 14. Logic 1550 produces two sets of outputs. Outputs 1570 produce ARBSTOP signals of the same kind as signals 824 shown in FIGS. 8 and 10; these shut down the source system unit which initiated the improper data transfer. Outputs 1580 prevent the transfer from affecting any system unit not in the same cluster as the source unit which caused the improper request. Continuing the above example, a fault in system units 410, request lines 1510, etc. may cause data path 54G1 to activate the incorrect sets of lines 1530. However, data-router filter logic 1550 detects that the only proper destinations from unit 410-0 are units 410-0, -1, -2, and -3 in the same domain cluster, as defined by the bits in registers 1560. An improper signal 1540, such as TO-7 designating 410-7 as the destination, activates ARBSTOP-0 line 1570-0, indicating that unit 410-0 has attempted an illegal transfer, and shuts down that unit. That is, the ARBSTOP signal goes to the source unit, and to other units in the same domain cluster, so that the error in domain cluster CA only affects the system units within domain cluster CA.

Logic 1550 also uses the definitions in cluster registers 1560 to interdict any TO signals 1540 from reaching a destination unit which is not in the same cluster as the unit which issues a FROM signal. In this example, an assertion of any of the TO lines 1540-0 through 1540-3 would be passed to the corresponding TO line 1580-0 through 1580-3, to enable the corresponding system unit 410-0 through 410-3 to receive data on lines 1530-0 through 1530-3. On the other hand, the simultaneous generation of a FROM signal on line 1520-0 and a TO signal 1550-7 —that is, to a unit in a different cluster— is blocked by logic 1550. Thus, the corresponding TO line 1580-7 remains dormant, and data path 54G1 does not pass data to system unit 410-7. In this manner, filter logic causes a transgression error to shut down the unit sourcing the data transfer by sending an ARBSTOP to that unit, and prevents the transfer from having any effect upon the destination unit, by inhibiting its TO line; so that no transfer is ever actually granted to that unit.

FIG. 15 shows only one data path of the crosspoint data router 440, FIG. 4. Additional data paths function in the same manner, requiring only further sets of filter logic 1550. Moreover, each data path may be split into multiple sections, for further fault isolation or redundancy, without affecting the operation of FIG. 15.

I claim as my invention:

1. A multiprocessor computer having hardware domains variable configurable by commands from an operator, said computer comprising:
   a plurality of separate system units for performing sequences of transactions, each said system unit being individually physically removable and replaceable within said computer, and each including at least one of processor unit for generating addresses within a predetermined global range.
      a memory unit for storing data at a set of addresses within said predetermined global range,
      an input/output adapter for generating and/or receiving a set of addresses within said predetermined global range:
   a global address router coupled to said system units for transferring addresses generated in any of said system units to others of said system units:
   a global data router for transferring data from any of said system units to others of said system units:
   a control-signal distributor for communicating a plurality of control signals from any of said system units to others of said system units for affecting the operation of all of said system units in response to conditions occurring in said any system unit:
   a domain configurator for electronically dividing said computer into a plurality of software-configurable hardware domains each comprising an arbitrary subset of said system units independently of any physical reconnection of said system units within said computer:
   a computer controller responsive to said commands for specifying to said domain configurator which of said system units belong to each of said hardware domains:
   a domain filter coupled to all of said system units for electronically inhibiting at least some of said control signals originating in those of said system units within one of said domains from affecting certain of said system units outside said one domain, wherein said domain filter is coupled to at least one of said global routers for inhibiting transactions on said one global router originating in those of said system units within one of said domains from being received in certain of said system units outside said one domain.

2. A computer according to claim 1, wherein said one global router is said global address router.

3. A computer according to claim 2, wherein said global address router has multiple paths coupled to all of said system units for carrying a plurality of transactions between different subsets of said system units simultaneously.

4. A computer according to claim 1, wherein said one global router is said global data router.

5. A computer according to claim 4, wherein said global data router has multiple paths coupled to all of said system units for carrying data associated with a plurality of transactions between different subsets of said system units simultaneously.

6. A computer according to claim 1, wherein said domain filter is coupled both to said global address router and to said global data router for inhibiting both addresses and data originating in those of said system units within one of said domains from being received in certain of said system units outside said one domain.

7. A computer according to claim 1, wherein said domain filter includes:
   a connection for identifying which of said system units has generated a current address in said address router;
   at least one domain-mask register for each of said system units specifying which of said system units belong to which of said domains,
   gating logic responsive to said source-identifying connection and to said domain-mask register for decoupling said system unit from all of said system units not in the same domain as said system unit having generated said current address.

8. A computer according to claim 7, wherein said domain filter includes
   a plurality of cluster registers each identifying which of said system units belong to a domain cluster, and responsive to a current one of said transactions;
   a connection for transmitting a valid-transaction signal to each of said system units in said common cluster for any of said transactions originating from one of said system units belonging to said domain cluster.

9. A computer according to claim 8, wherein said domain filter includes a shared-address register indicative of a range of shared addresses among different system units within said domain cluster.

10. A multiprocessor computer having hardware domains variably configurable by commands from an operator, said computer comprising:
   a plurality of separate system units for performing sequences of transactions, each said system unit being individually physically removable and replaceable within said computer, and each including at least one of processor unit for generating addresses within a predetermined global range.
      a memory unit for storing data at a set of addresses within said predetermined global range.
      an input/output adapter for generating and/or receiving a set of addresses within said predetermined global range:
   a global address router coupled to said system units for transferring addresses generated in any of said system units to others of said system units:
   a global data router for transferring data from any of said system units to others of said system units:
   a control-signal distributor for communicating a plurality of control signals from any of said system units to others of said system units for affecting the operation of all of said system units in response to conditions occurring in said any system unit:
   a domain configurator for electronically dividing said computer into a plurality of software-configurable hardware domains each comprising an arbitrary subset of said system units independently of any physical reconnection of said system units within said computer, said domain configurator further combining a plurality of said hardware domains into a domain cluster comprising an arbitrary subset of said domains independently of any physical reconnection of said system units within said computer;

a computer controller responsive to said commands for specifying to said domain configurator which of said system units belong to each of said hardware domains, said computer controller being responsive to further ones of said commands for specifying to said domain configurator which of said system units belong to said domain cluster;

a domain filter coupled to all of said system units for electronically inhibiting at least some of said control signals originating in those of said system units within one of said domains from affecting certain of said system units outside said one domain, said domain filter permitting said at least some control signals originating in those of said system units within said one domain to affect those of said systems units outside said one domain but within said domain cluster.

11. A computer according to claim 10, wherein one of said domains within said domain cluster includes physical memory accessible within the same predetermined shared address range by a different domain within said domain cluster.

12. A method of partitioning a computer having a plurality of system units, a global address router, a global data router, a control-signal distributor, and a domain filter into a plurality of independent hardware domains under programmable control, comprising:

(a) starting a configuration modes
(b) receiving specification data defining a subset of said system units for inclusion within one of said hardware domains:
(c) loading said specification data into a domain filter so as to render those of said system units within said one domain responsive to certain control signals in said distributor, and to render others of said system units unresponsive to said distributor:
(d) repeating steps (b) and (c) for further specification data defining a different subset of said system units.

wherein step (c) is also responsive to said specification data for loading said domain filter so as to render those of said system units within said one domain responsive to addresses on said global address router originating from those of said system units within said one domain, and to render said system units within said first domain unresponsive to addresses on said global address router originating from at least some of those of said system units not within said first domain.

13. A method according to claim 12, comprising the further steps of:

(f) receiving second specification data defining a cluster of multiple ones of said domains;
(g) loading said second data into said domain filter so as to render those of said system units within said cluster of domains responsive to addresses on said global address router originating from those of said system units within said cluster of domains.

14. A method according to claim 13, comprising the further steps of:

(h) receiving third specification data defining a shared range of addresses physically present within one of said domains, and accessible to other domains within said cluster of domains;
(i) loading said third data into said domain filter so as to render those of said system units within said cluster of domains responsive to addresses on said global address router originating from those of said system units within said cluster of domains but only within said shared range.

15. A method according to claim 14, wherein said shared range is less than the total range of addresses of memory physically present on at least one of those system units within said domain cluster.

16. A method of partitioning a computer having a plurality of system units, a global address router, a global data router, a control-signal distributor, and a domain filter into a plurality to independent hardware domains under programmable control, comprising:

(a) starting a configuration mode;
(b) receiving specification data defining a subset of said system units for inclusion within one of said hardware domains;
(c) loading said specification data into a domain filter so as to render those of said system units within said one domain responsive to certain control signals in said distributor, and to render others of said system units unresponsive to said distributor;
(d) repeating steps (b) and (c) for further specification data defining a different subset of said system units; and thereafter
(j) broadcasting a transaction from one of said system units within said first domain via said global address router to all of said system units, both within and without said first domain;
(k) filtering said transaction at each of said system units such that those of said system units within said first domain are enabled to respond to said transaction, and others of said system units outside said first domain are disabled from responding to said transaction.

17. A method according to claim 16, wherein steps 0) and (k) are performed after step (e).

18. A method according to claim 16, wherein step (k) disables less than all of said system units outside said first domain.

19. A method according to claim 16, wherein a plurality of said system units in different ones of said domains physically include memory having addresses within respective ranges, and wherein said addresses of said respective ranges overlap at least partially.

20. A system unit for a multiprocessor computer having a global address router, a global data router, and a control-signal distributor for interconnecting a plurality of other ones of said system units, said computer also having a computer controller, said system unit comprising:

means coupled to both of said global routers for accepting at least one processor unit for generating addresses within a predetermined global range;
means coupled to said global routers for accepting at least one memory unit for storing data at a set of addresses within said predetermined global range;
means coupled to said global routers for accepting at least one input/output adapter for generating and/or receiving a set of addresses within said predetermined global range;
means connected to at least one of said preceding means for generating control signals to said distributor, said control signals representing error conditions within said system unit, and for receiving control signals representing error conditions within said other system units;
means for filtering said control signals such that only those control signals from selectable ones of said other units can affect the operation of said system unit;
means connectible to said computer controller for selecting said ones of said other units.

21. A system unit according to claim 20, said filtering means including:
  a domain mask register for holding data designating said selectable ones of said other units;
  gating means for passing certain signals from said selectable ones, and for blocking said certain signals from others of said system units.

22. A system unit according to claim 21, further comprising means for loading variable data into said domain mask register.

23. A system unit according to claim 20, said filtering means including a shared-memory register for holding data designating memory physically installed on any of said system units in said computer in a portion of said global range as being accessible to said system unit.

24. A system unit according to claim 23, further comprising means for loading variable data into said shared-memory register.

25. A system unit according to claim 23, said filtering means including at least one further shared-memory register for holding data designating an address range comprising only a portion of said memory physically installed on said any system unit.

26. One system unit of a plurality of system units for a multiprocessor computer including
  a global address router for transferring addresses originating in any of said system units to all others of said system units, each address of said addresses having a source identifier indicating which of said plurality of system units had originated said each address,
  a global data router for transferring data from any of said system units to all others of said system units,
  a control-signal distributor for communicating a plurality of control signals from any of said system units to all others of said system units for affecting the operation of all of said system units in response to conditions occurring in said any system unit,
  a domain configurator for electronically dividing said computer into a plurality of software-configurable hardware domains each comprising an arbitrary subset of said system units independently of any physical reconnection of said system units within said computer,
  a computer controller responsive to said commands for specifying to said domain configurator which of said system units belong to each of said hardware domains,
  a domain filter coupled to all of said system units for electronically inhibiting at least some of said control signals originating in those of said system units within one of said domains from affecting certain of said system units outside said one domain, said one system unit comprising:
  at least one subsystem connected to said global address router for coupling said addresses between said subsystem and any other of said system units, and connected to said global data router for transferring transaction data between said subsystem and any other of said system units, said subsystem being taken from the group consisting of
    a processor subsystem for executing transactions,
    a memory subsystem for storing data within said global range,
    an input/output subsystem for communicating with input/output adapters;
  at least one generator of said control signals coupled to said distributor;
  at least one receptor of said control signals;
  a domain writable mask register receiving from said computer controller a value representing which of said plurality of system units belong to the same domain as said one system unit;
  a comparator coupled to said domain mask register for producing an inhibiting signal when said source identifier indicates that said each address did not originate within said same domain, said inhibiting signal being coupled to said at least one subsystem so as to render it unresponsive to said each address.

27. A system unit according to claim 26, wherein said domain configurator further combines a plurality of said hardware domains into a domain cluster comprising an arbitrary subset of said domains independently of any physical reconnection of said system units within said computer;
  at least one writable shared-memory mask register which of said plurality of system units belong to the same domain cluster as said one system unit,
  said comparator being further coupled to said domain mask register for producing said inhibiting signal when said source identifier indicates that said each address originated at certain of said system units outside said same domain cluster.

28. A system unit according to claim 16, wherein said at least one subsystem includes said memory subsystem for storing data within a portion of said global address range, said system unit further comprising:
  at least one shared-memory address register receiving from said computer controller a value defining a shared range of memory addresses within said portion of said global range,
  said comparator being further responsive to said shared-memory address register for inhibiting said memory subsystem when said each address lies outside said shared range.

29. A system unit according to claim 26, wherein said at least one generator of said control signals forms a portion of a local address arbiter for requesting and receiving accesses to said global address router.

30. A system unit according to claim 29, wherein said at least one receptor of said control signals further forms a portion of said local address arbiter.

31. A system unit according to claim 26, wherein said one system unit includes at least two different ones of said subsystems.

32. A system unit according to claim 31, wherein said one system unit includes all three of said subsystems.

33. A system unit according to claim 26, wherein said processor subsystem includes a plurality of individual microprocessors.

34. A multiprocessor computer having hardware domains variably configurable by commands from an operator, said computer comprising:
  a plurality of separate system units for performing sequences of transactions, each said system unit being individually physically removable and replaceable within said computer, and each including at least one of
    processor unit for generating addresses within a predetermined global range,
    a memory unit for storing data at a set of addresses within said predetermined global range,
    an input/output adapter for generating and/or receiving a set of addresses within said predetermined global range;
  a global address router coupled to said system units for transferring addresses generated in any of said system units to others of said system units;

a global data router for transferring data from any of said system units to others of said system units;

a control-signal distributor for communicating a plurality of control signals from any of said system units to all others of said system units for affecting the entire operation of all of said system units in response to error and status conditions occurring in said any system unit;

a domain configurator for electronically dividing said computer into a plurality of software-configurable hardware domains each comprising an arbitrary subset of said system units independently of any physical reconnection of said system units within said computer;

a computer controller responsive to said commands for specifying to said domain configurator which of said system units belong to each of said hardware domains;

a domain filter coupled to all of said system units for electronically inhibiting at least some of said control signals originating in those of said system units within one of said domains from affecting certain of said system units outside said one domain.

35. A computer according to claim 34, wherein said domain filter is coupled to at least one of said global routers for inhibiting transactions on said one global router originating in those of said system units within one of said domains from being received in certain of said system units outside said one domain.

36. A computer according to claim 34, wherein:

said domain configurator further combines a plurality of said hardware domains into a domain cluster comprising an arbitrary subset of said domains independently of any physical reconnection of said system units within said computer;

said computer controller is responsive to further ones of said commands for specifying to said domain configurator which of said system units belong to said domain cluster;

said domain filter permitting said at least some control signals originating in those of said system units within said one domain to affect those of said systems units outside said one domain but within said domain cluster.

37. A method of partitioning a computer having a plurality of system units, a global address router, a global data router, a control-signal distributor coupled directly to every one of said system units, and a domain filter into a plurality of independent hardware domains under programmable control, comprising:

(a) starting a configuration mode;

(b) receiving specification data defining a subset of said system units for inclusion within one of said hardware domains;

(c) loading said specification data into a domain filter so as to render those of said system units within said one domain responsive to certain control signals in said distributor, and to render others of said system units unresponsive to said distributor, said certain control signals representing error and status conditions occurring in any of said system units for affecting the operation of the entire system;

(d) repeating steps (b) and (c) for further specification data defining a different subset of said system units.

38. A method according to claim 37, wherein step (c) is also responsive to said specification data for loading said domain filter so as to render those of said system units within said one domain responsive to addresses on said global address router originating from those of said system units within said one domain, and to render said system units within said first domain unresponsive to addresses on said global address router originating from at least some of those of said system units not within said first domain.

39. A method according to claim 37, further comprising the steps, performed after step (d), of:

(e) broadcasting a transaction from one of said system units within said first domain via said global address router to all of said system units, both within and without said first domain;

(f) filtering said transaction at each of said system units such that those of said system units within said first domain are enabled to respond to said transaction, and others of said system units outside said first domain are disabled from responding to said transaction.

* * * * *